(12) United States Patent
Williams et al.

(10) Patent No.: US 11,287,575 B2
(45) Date of Patent: Mar. 29, 2022

(54) METHOD OF MAKING HINGED SELF-REFERENCING FABRY-PÉROT CAVITY SENSORS

(71) Applicant: US Gov't as represented by Secretary of Air Force, Wright-Patterson AFB, OH (US)

(72) Inventors: Jeremiah C Williams, Dayton, OH (US); Hengky Chandrahalim, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/236,028

(22) Filed: Apr. 21, 2021

(65) Prior Publication Data

US 2021/0294039 A1    Sep. 23, 2021

Related U.S. Application Data

(60) Continuation-in-part of application No. 17/229,986, filed on Apr. 14, 2021, and a continuation-in-part of application No. 17/136,564, filed on Dec. 29, 2020, now Pat. No. 11,156,782, which is a division of
(Continued)

(51) Int. Cl.
*G02B 6/02* (2006.01)
*G02B 6/293* (2006.01)
*G02B 6/12* (2006.01)
*G01L 7/06* (2006.01)

(52) U.S. Cl.
CPC ..... *G02B 6/29359* (2013.01); *G02B 6/29358* (2013.01); *G01L 7/065* (2013.01); *G02B 6/02033* (2013.01); *G02B 2006/12159* (2013.01)

(58) Field of Classification Search
CPC ............ G02B 6/02033; G02B 6/29358; G02B 6/29359; G02B 2006/12159
See application file for complete search history.

(56) References Cited

U.S. PATENT DOCUMENTS

| 8,253,945 B2 * | 8/2012 | Gahan | G01D 5/268 356/480 |
|---|---|---|---|
| 10,359,316 B1 * | 7/2019 | Han | G01J 5/0887 |
| 10,725,373 B1 * | 7/2020 | Kumar | G03F 7/0002 |

* cited by examiner

*Primary Examiner* — Ryan A Lepisto
(74) *Attorney, Agent, or Firm* — AFMCLO/JAZ; David E. Franklin

(57) ABSTRACT

A method is provided for fabricating a passive optical sensor on a tip of an optical fiber. The method includes perpendicularly cleaving a tip of an optical fiber and mounting the tip of the optical fiber in a specimen holder of a photosensitive polymer three-dimensional micromachining machine. The method includes forming a three-dimensional microscopic optical structure within the photosensitive polymer that comprises a two cavity Fabry-Perot Interferometer (FPI) having a hinged optical layer that is pivotally coupled to a suspended structure. The method includes removing an uncured portion of the photosensitive polymer using a solvent. The method includes depositing a reflective layer on a mirror surface of the hinged optical layer. The method includes positioning the pivotally hinged optical layer to a closed position with the suspended structure, aligning the mirror surface with the cleaved tip of the optical fiber.

4 Claims, 11 Drawing Sheets

Related U.S. Application Data application No. 16/785,718, filed on Feb. 10, 2020, now Pat. No. 10,942,313.

(60) Provisional application No. 63/172,170, filed on Apr. 8, 2021, provisional application No. 63/170,054, filed on Apr. 2, 2021, provisional application No. 62/804,996, filed on Feb. 13, 2019, provisional application No. 62/964,210, filed on Jan. 22, 2020.

METHOD OF MAKING HINGED SELF-REFERENCING FABRY-PÉROT CAVITY SENSORS

CROSS-REFERENCE TO RELATED APPLICATIONS

This application claims the benefit of priority under 35 U.S.C. § 120 as a continuation-in-part to U.S. patent application Ser. No. 17/229,986 entitled "A Monolithically Integrated Microscale Pressure Sensor On An Optical Fiber Tip" and filed 14 Apr. 2021, which in turn claims the benefit of priority under 35 U.S.C. § 119(e) to: (i) U.S. Provisional Application Ser. No. 63/172,170 entitled "Mechanically-enabled microscale Fabry-Perot optical cavity on an optical fiber tip," filed 8 Apr. 2021; (ii) U.S. Provisional Application Ser. No. 63/170,054 entitled "A Monolithically Integrated Microscale Pressure Sensor on an Optical Fiber Tip," filed 17 Apr. 2020; (iii) and U.S. Provisional Application Ser. No. 63/011,435 entitled "A Monolithically Integrated Microscale Pressure Sensor on an Optical Fiber Tip," filed 17 Apr. 2020, the contents and cited references of all of which are incorporated herein by reference in their entirety.

This application claims the benefit of priority under 35 U.S.C. § 120 as a continuation-in-part to U.S. patent application Ser. No. 17/136,564, entitled "Method of making temperature-immune self-referencing Fabry-Pérot cavity sensors", filed 29 Dec. 2020, which in turn is a divisional to U.S. patent application Ser. No. 16/785,718 entitled "Method of making temperature-immune self-referencing Fabry-Pérot cavity sensors," filed on 10 Feb. 2020, which in turn claims the benefit of priority under 35 U.S.C. § 119(e) to U.S. Provisional Application Ser. No. 62/804,996 entitled "Temperature-immune self-referencing Fabry-Pérot cavity sensors," filed 13 Feb. 2019, and to U.S. Provisional Application Ser. No. 62/964,210 entitled "Temperature-immune self-referencing Fabry-Pérot cavity sensors," filed 22 Jan. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of pressure sensing, and more particularly to passive optical pressure sensors.

2. Description of the Related Art

Modern technology has been spurred foreword by the advancement and miniaturization of sensors. It is paramount to observe and quantify environmental phenomenon for automation and intelligent decision making. Sensors are the eyes and ears of a mechanical system, and the more information they can gather, the better. Automation can only be achieved safely if there is sufficient data and feedback to correct errors. The more information decision makers can gather, the greater their situational awareness. Like all components, sensors must carefully balance their size, weight, and power (SWAP) with their performance. Lowering the SWAP of sensors without sacrificing utility and accuracy can free up power and weight on sensitive platforms such as aircraft and satellites for other hardware. Furthermore, smaller sensors can interrogate more individual points in the system of interest before overlapping with one another. An array of small, lower fidelity sensors can sometimes provide a more complete picture of a situation than a single, large, high fidelity sensor. Developing low SWAP sensors can bring these benefits to defense technology.

Microscopic additive manufacturing technology enables fabricating microscopic sensors. Although additive manufacturing is capable of producing internal cavities that can support sensing pressure changes, the technology does not lend itself to depositing certain layers and structures that can readily performed on larger sensors that are assembled from component parts. What can be achieved with these internal cavities is thus limited when some particular surface properties are required.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

A method is provided for fabricating a passive optical sensor on a tip of an optical fiber. The method includes perpendicularly cleaving a tip of an optical fiber and mounting the tip of the optical fiber in a specimen holder of a photosensitive polymer three-dimensional micromachining machine. The method includes forming a three-dimensional microscopic optical structure within the photosensitive polymer that comprises a two cavity Fabry-Pérot Interferometer (FPI) having a hinged optical layer that is pivotally coupled to a suspended structure. The method includes removing an uncured portion of the photosensitive polymer using a solvent. The method includes depositing a reflective layer on a mirror surface of the hinged optical layer. The method includes positioning the pivotally hinged optical layer to a closed position with the suspended structure, aligning the mirror surface with the cleaved tip of the optical fiber.

Figure 1:
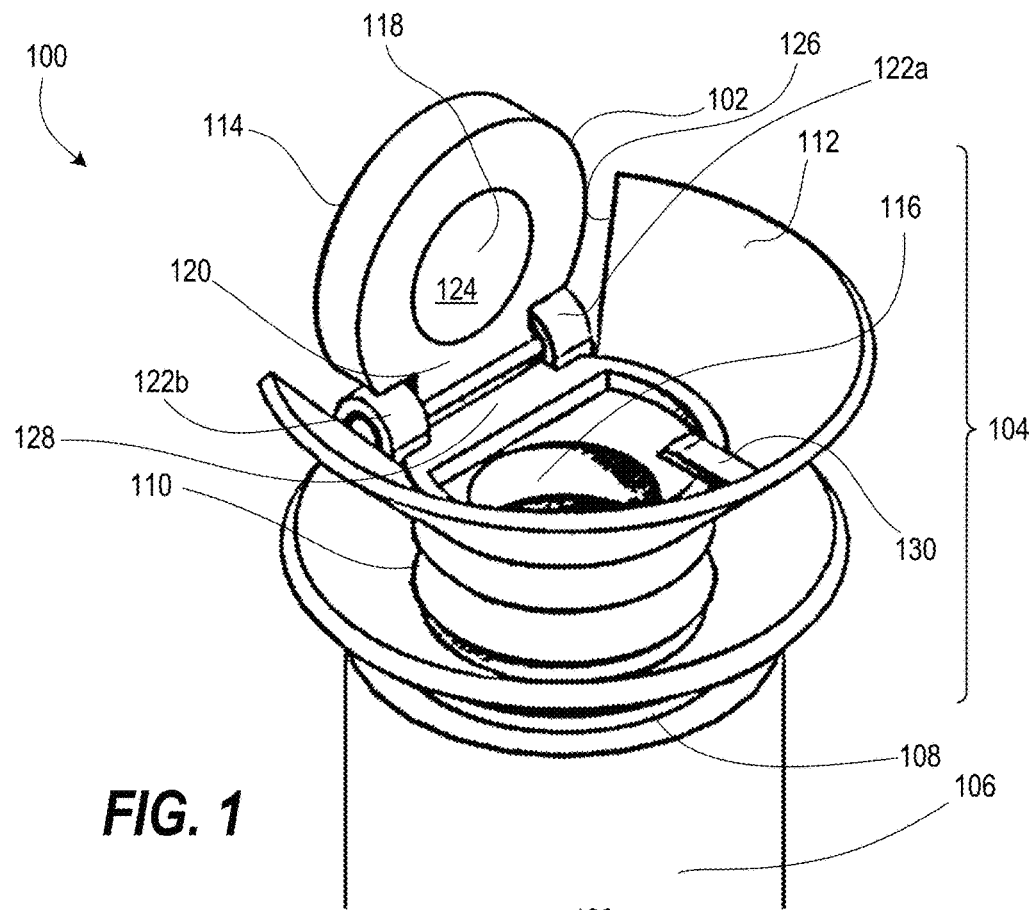
FIG. 1 depicts three-dimensional view of a passive microscopic Fabry-Pérot Interferometer (FPI) pressure sensor as formed during additive manufacturing with a hinged curved mirror in an intermediate open position, according to one or more embodiments.

According to aspects of the present disclosure, FIG. 1 depicts a three-dimensional view of a passive microscopic Fabry-Pérot Interferometer (FPI) pressure sensor 100 with a hinged curved mirror door 102 in an intermediate open position. A three-dimensional microscopic optical enclosure 104 is formed during additive manufacturing and mounted on a cleaved end of an optical fiber 106 using an adhesion pad 108. In one or more embodiments, the optical enclosure 104 includes a spring body 110 that is longitudinally positioned between proximal and distal adhesive retaining features respectively provided by a full collar 111 and a partial collar 112. The hinged curved mirror door 102 includes a disc 114 having a shape sufficient to close a distal opening 116 of the spring body 110. The undersurface of the disc 114 includes a curved mirror 118. Support material 120 extending from the disc 114 engages left and right pin housing 122a 122b extending distally from the partial collar 112 for pivoting by the hinged curved mirror door 102.

Figure 2:
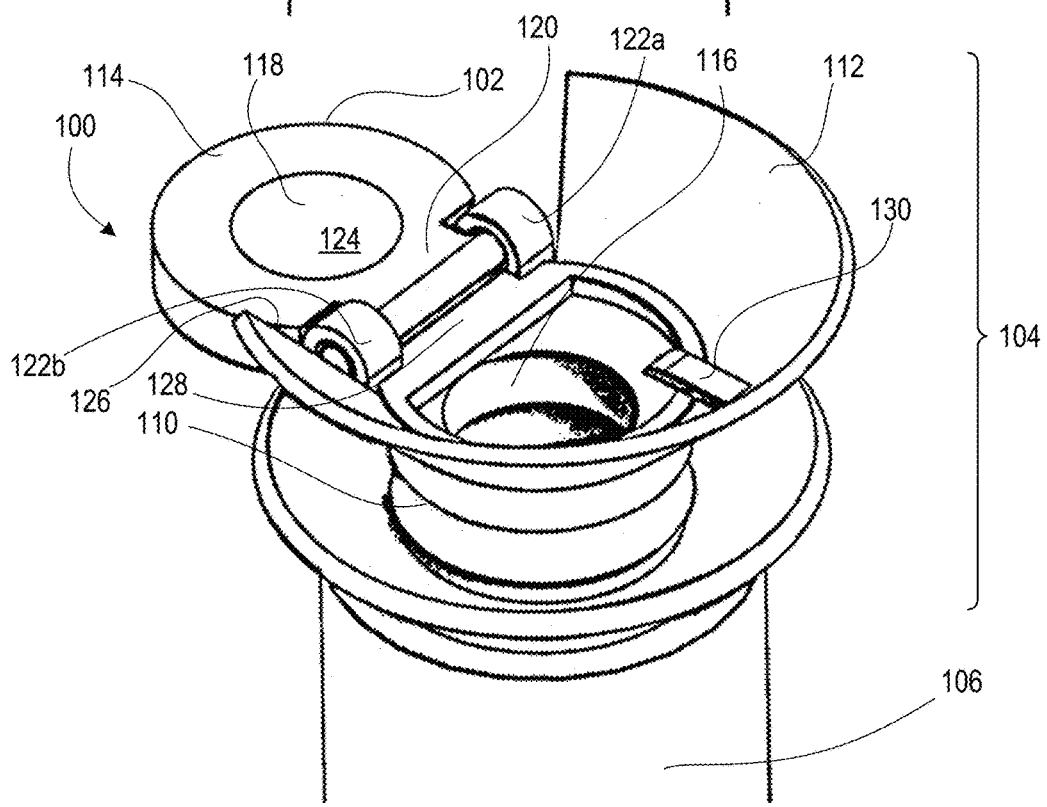
FIG. 2 depicts a three-dimensional view of the passive microscopic FPI pressure sensor of FIG. 1 with the hinged curved mirror in a fully open position for reflective layer deposition, according to one or more embodiments.

FIG. 2 depicts a three-dimensional view of the passive microscopic FPI pressure sensor 100 with the hinged curved mirror door 102 in a fully open position. In the full open position, a subsequent manufacturing process can be used to deposit a reflective surface 124 on an underside of the hinged curved mirror door 102 to form a partially reflective, partially transmissive curved mirror 118. The partially collar 112 has an opening 126 that allows the hinged curved mirror door 102 to pivot to the fully-open position. A ledge 128 of the partial collar 112 below the support material 120 of the hinged curved mirror door 102 aligns the curved mirror 118 with the optical fiber 106.

Figure 3:
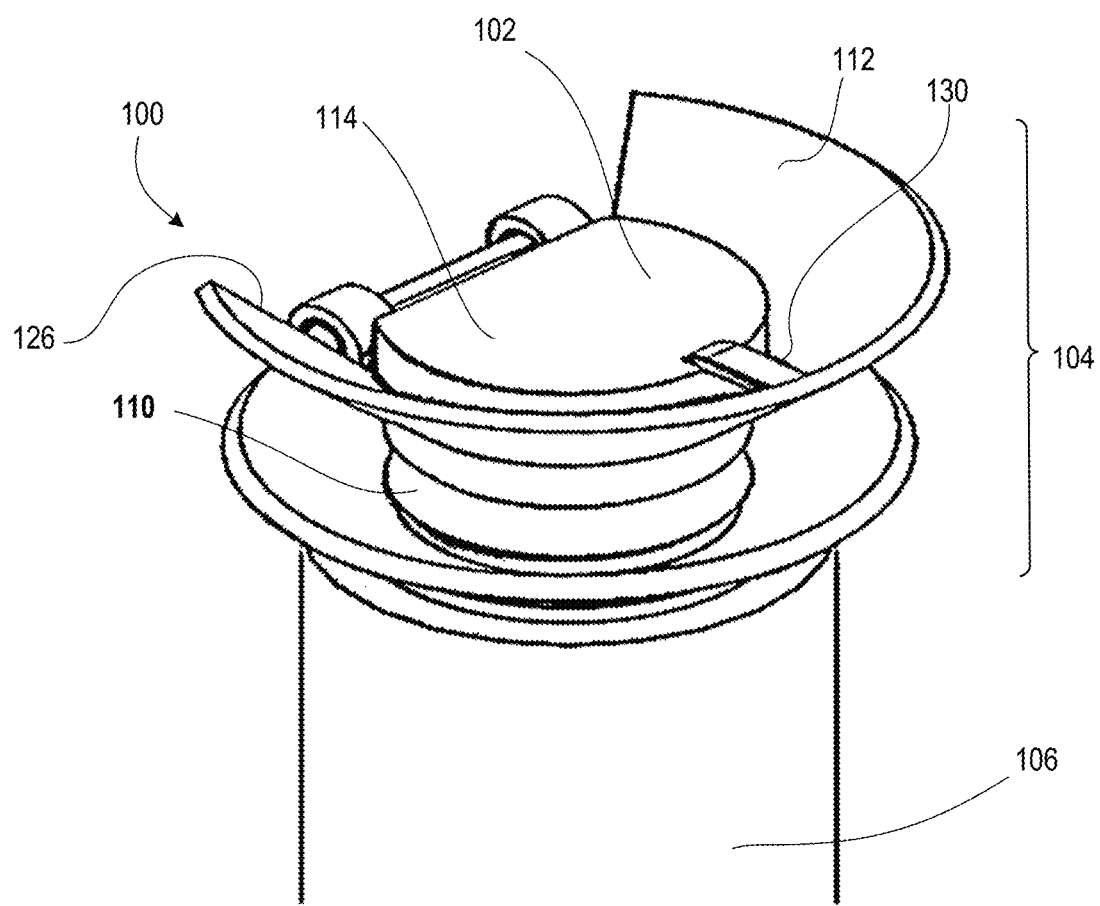
FIG. 3 depicts a three-dimensional view of the passive microscopic FPI pressure sensor of FIG. 1 with the hinged curved mirror in a closed and latched position to a telescoping optical enclosure formed on a cleaved tip of an optical fiber, according to one or more embodiments.

FIG. 3 depicts a three-dimensional view of the passive microscopic FPI pressure sensor 100 with the hinged curved mirror 102 in a closed and latched position, closing the opening 126 in the telescoping optical enclosure provided within the spring body 110. Disc 114 is formed of optically transmissive material. Latching mechanism 130 extending from the partial collar 112 engages the hinged curved mirror door 102.

Figure 4:
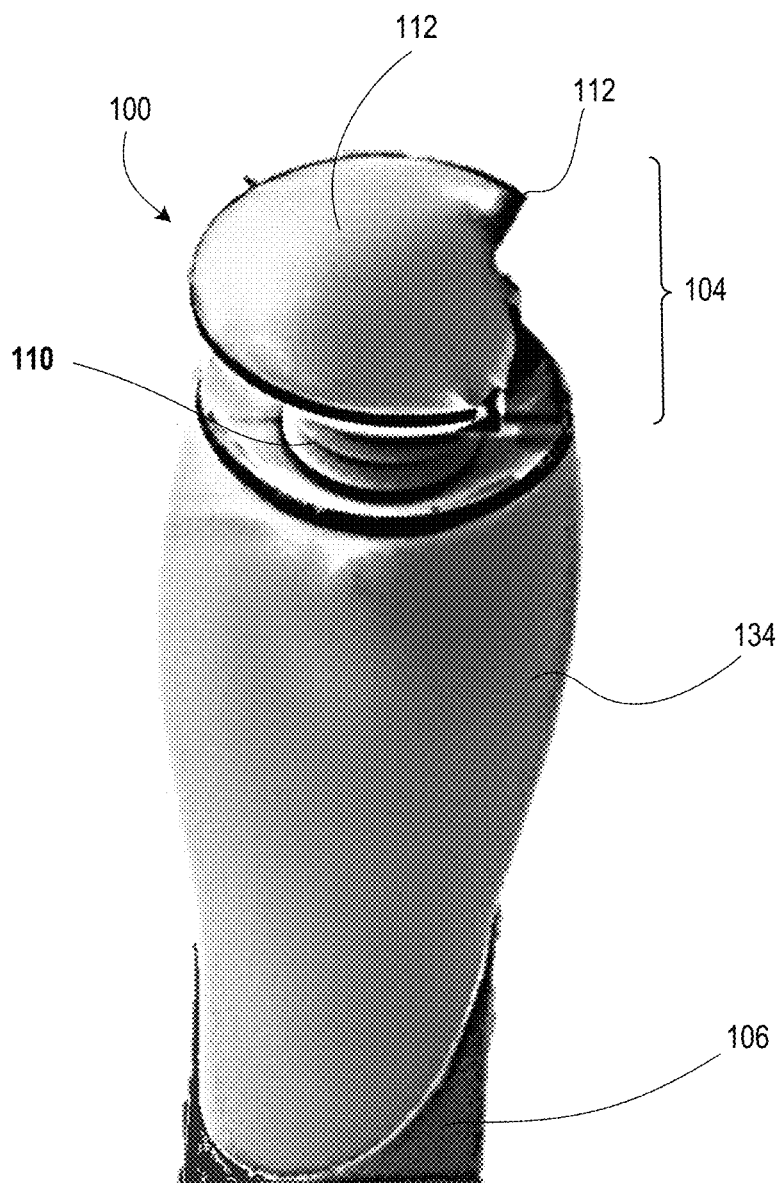
FIG. 4 depicts a three-dimensional view of the passive microscopic FPI pressure sensor of FIG. 3 with optical sealant pneumatically sealing the hinged curved mirror to the telescoping optical enclosure and with optical sealant adhering a lower portion of the FPI pressure sensor to the optical fiber, according to one or more embodiments.

FIG. 4 depicts a three-dimensional view of the passive microscopic FPI pressure sensor of FIG. 3 with a distal portion of optical sealant 132 over the partial collar 112 and the hinged curved mirror 102 (FIG. 3), pneumatically opening 126. A proximal portion of optical sealant 134 is adhering to an underside of full collar 110 and to the optical fiber 106 to secure the three-dimensional microscopic optical enclosure 104 to the optical fiber 106.

Figure 5:
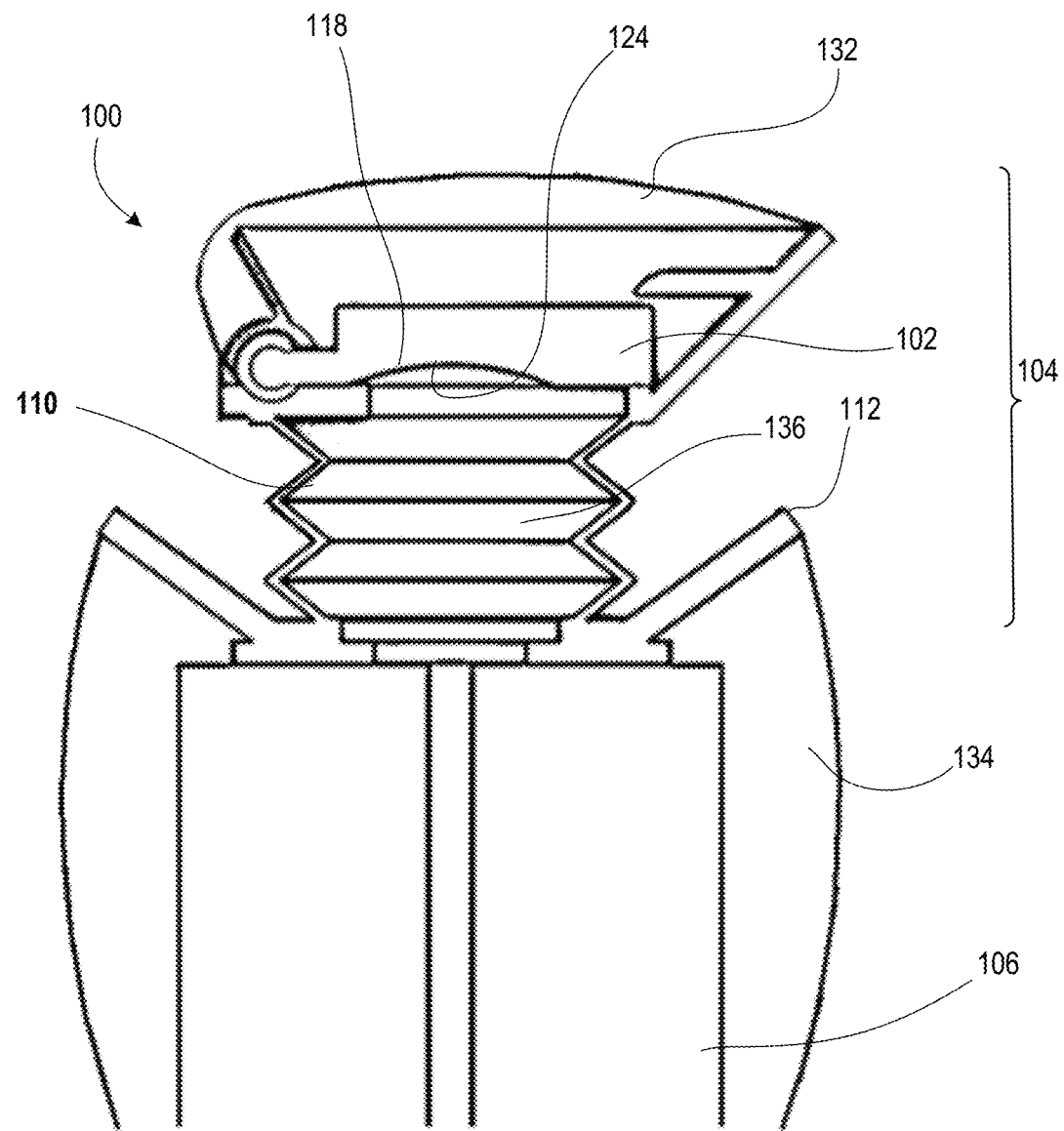
FIG. 5 depicts a side cross-sectional view of the passive microscopic FPI pressure sensor of FIG. 4 with the telescoping optical enclosure in a longitudinally expanded state, according to one or more embodiments.

FIG. 5 depicts a side cross-sectional view of the passive microscopic FPI pressure sensor 100 with the telescoping optical enclosure provided by the spring body 110 in a longitudinally expanded state, Spring body 110 has a nominal volume in the presence of vacuum both internally and externally. For a given quantity of gas 136, the spring body 110 seeks equilibrium between internal and external air pressures with some compensation for resiliency of the pleated corrugated tubular sidewalls of the spring body 110.

Incident light 150 is guided by the optical fiber 106 to cleaved end 152 of the optical fiber 106. Some of the incident light is reflected at a proximal reflective surface 156 on the cleaved end of the optical fiber 106, returning up the optical fiber 106 as returning light 158 with a portion continuing distally within the spring body 110 as distally moving light 160 within spring body 110. A portion of the resonant wavelengths of the distally moving light 160 pass passes through the distal reflective surface 124, the disc 114, and exit the pressure sensor 100. Some of the light reflects off of the distal reflective surface 124 returning as proximally moving light 162 within the spring body 110 toward the proximal reflective surface 156. Some of the proximally moving light 162 continues on as part of the returning light 154. Another portion can be reflected again within spring body 110. The wavelengths that resonate within the spring body 110 depend on the internal longitudinal dimension of the spring body 110, which in turn depends on the external pressure.

Figure 6:
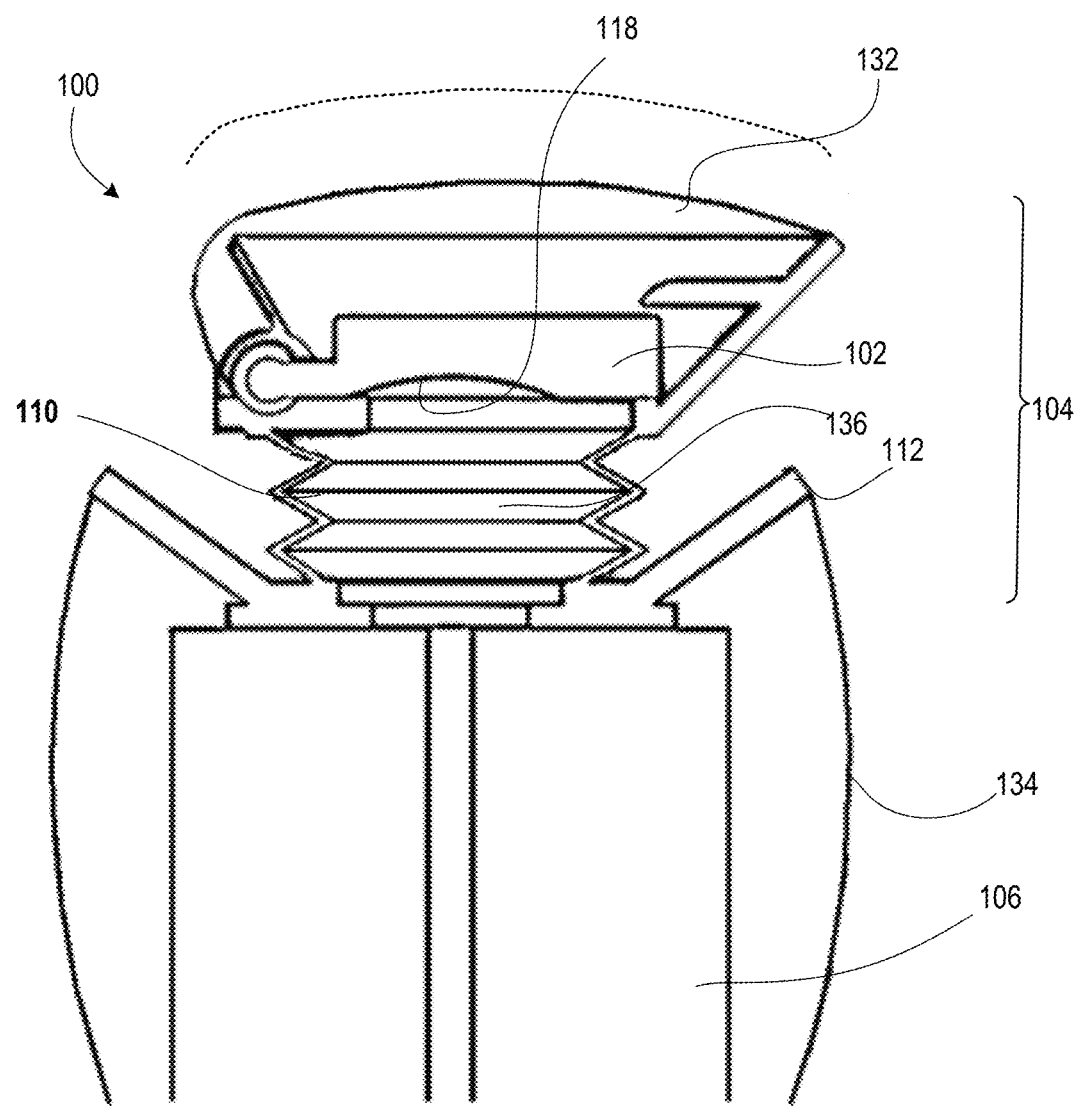
FIG. 6 depicts a side cross-sectional view of the passive microscopic FPI pressure sensor of FIG. 4 with the telescoping optical enclosure in a longitudinally contracted state, according to one or more embodiments.

FIG. 6 depicts a side cross-sectional view of the passive microscopic FPI pressure sensor 100 with the telescoping optical enclosure in a longitudinally contracted state due to an increased external pressure. The wavelength that is transmitted out of the passive microscopic FPI pressure sensor 100 thus changes.

Figure 7:
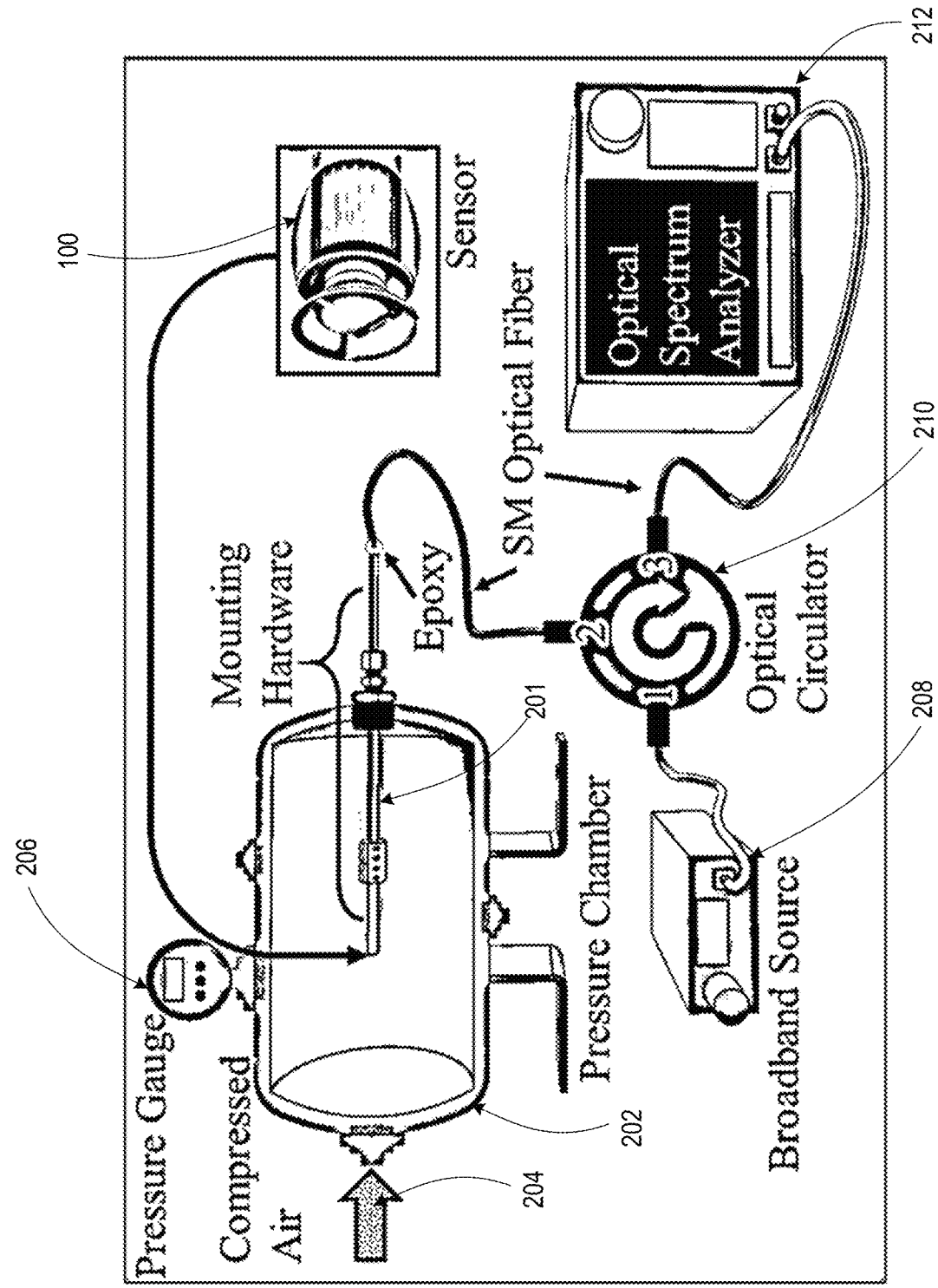
FIG. 7 depicts a diagram of a laboratory setup for testing the passive microscopic FPI pressure sensor, according to one or more embodiments.

FIG. 7 depicts a diagram of a laboratory setup 200 for testing the passive microscopic FPI pressure sensor 100. The FPI pressure sensor 100 held by mounting hardware 201 is positioned in a pressure chamber 202 having a pressure that is adjusted by selective introduction of compressed air 204 with pressure measured by a pressure gauge 206. A broadband source 208 introduces incident light to an optical circulator 210 that is directed to the FPI pressure sensor 100. The optical circulator 210 received return light from the FPI pressure sensor 100 that is directed to an optical spectrum analyzer 212.

Figure 8A:
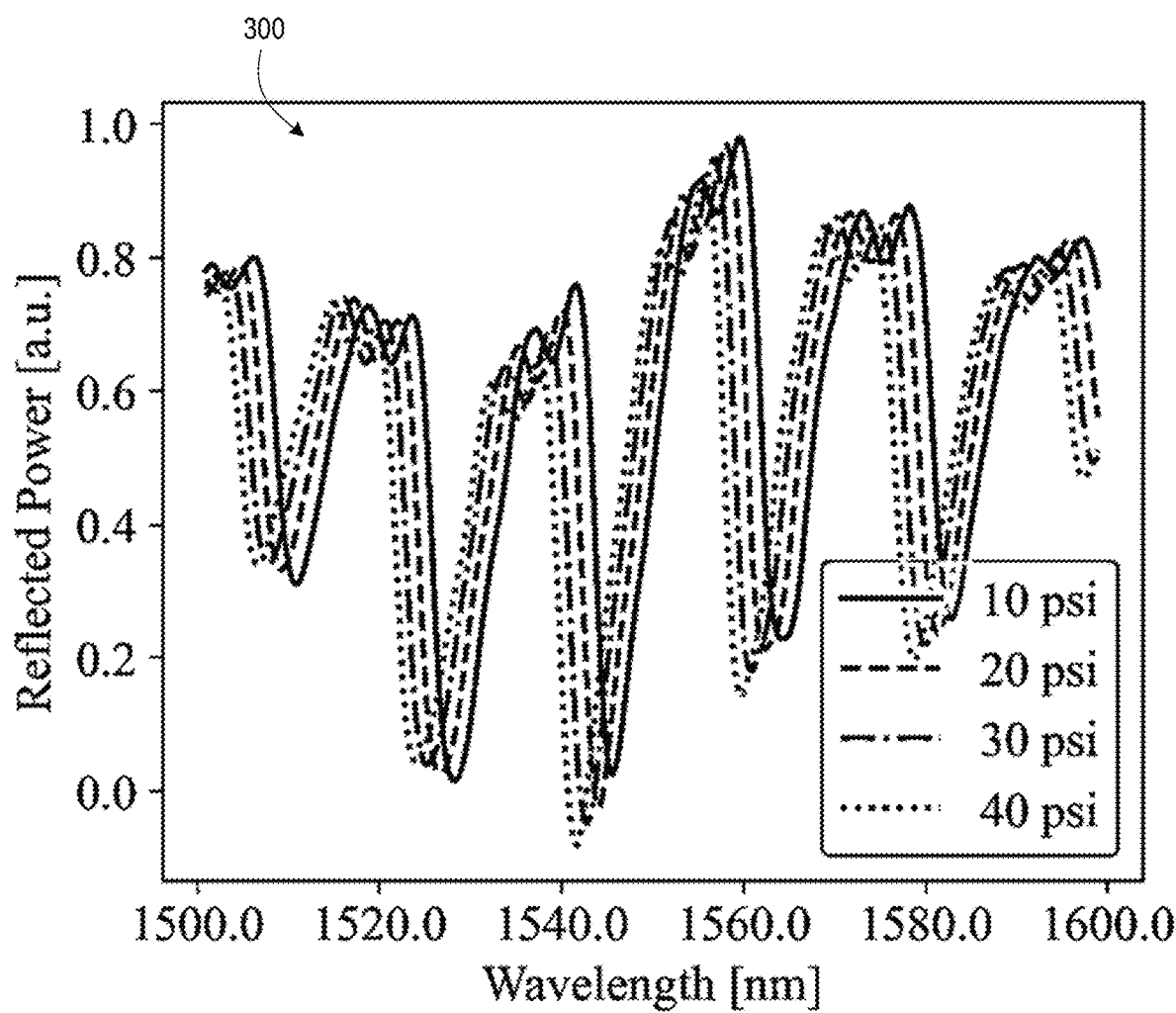
FIG. 8A depicts a graphical plot of reflected power at multiple external pressures by a prototype FPI pressure sensor as a function of wavelength, according to one or more embodiments.

FIG. 8A depicts a graphical plot 300 of reflected power at multiple external pressures by a prototype FPI pressure sensor as a function of wavelength. Each low point on the curve moves in correspondence to the external pressure on the pressure sensor.

Figure 8B:
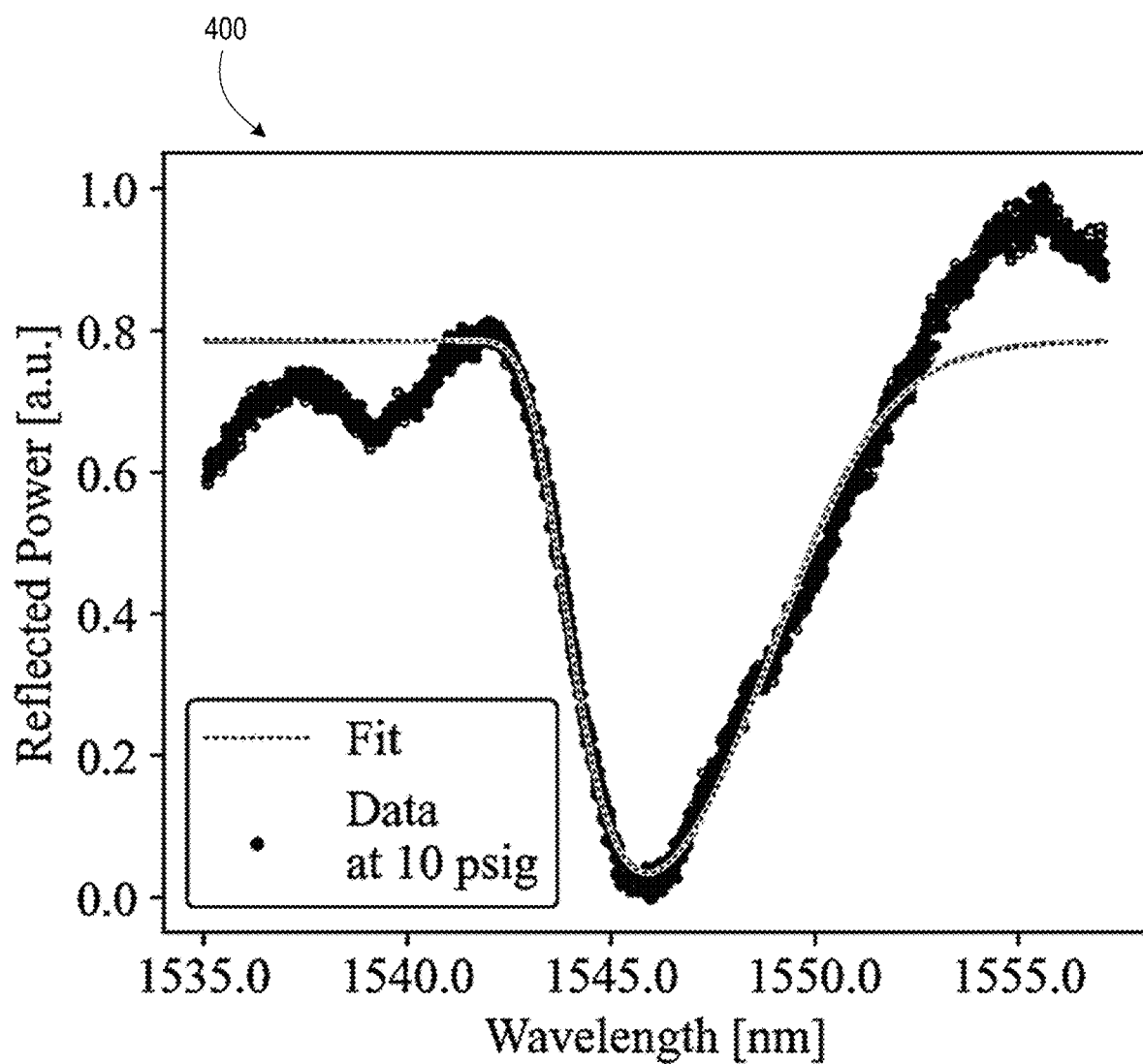
FIG. 8B depicts a graphical plot of reflected power at one pressure by the prototype FPI pressure sensor as a function of wavelength that is annotated with a curve fit plot, according to one or more embodiments.

FIG. 8B depicts a graphical plot 400 of reflected power at one pressure by the prototype FPI pressure sensor as a function of wavelength that is annotated with a curve fit plot. The fit plot can be used to detect the pressure.

Figure 9A:
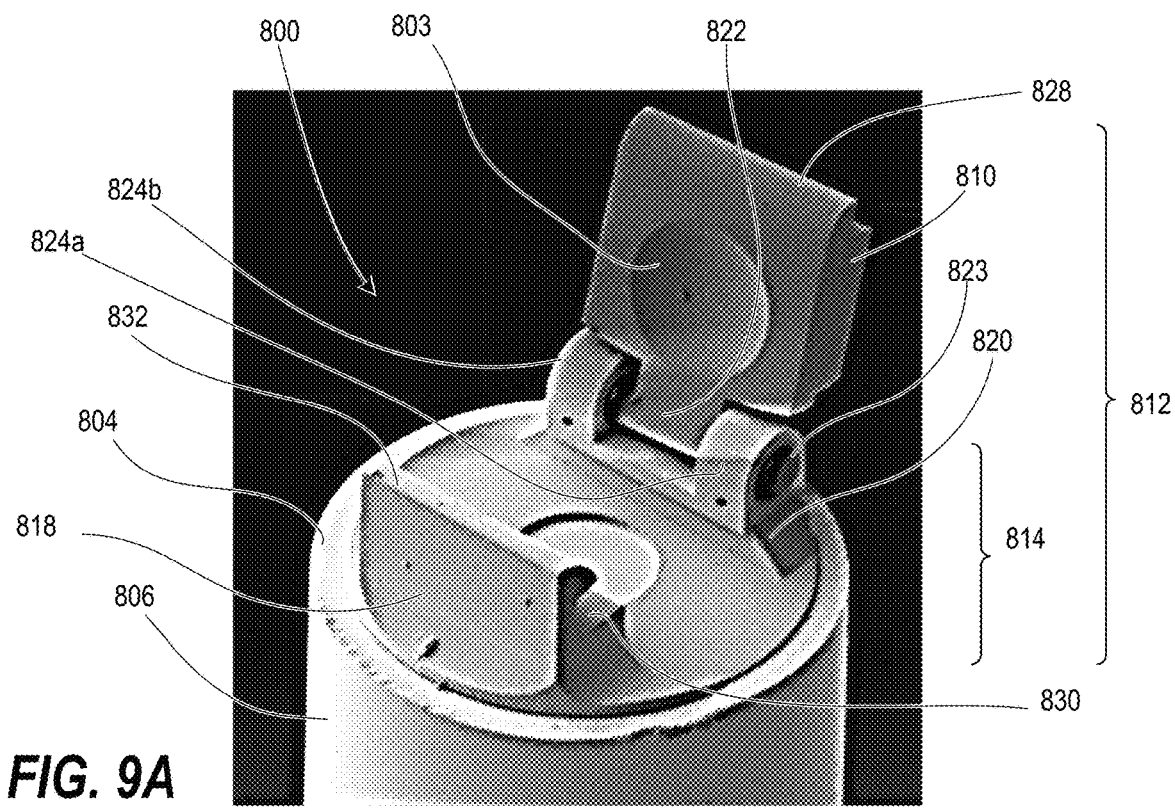
FIG. 9A depicts a three-dimensional scanning electron microscope (SEM) image of a passive microscopic FPI sensor having a hinged mirror surface in an open position, according to one or more embodiments.
Figure 9B:
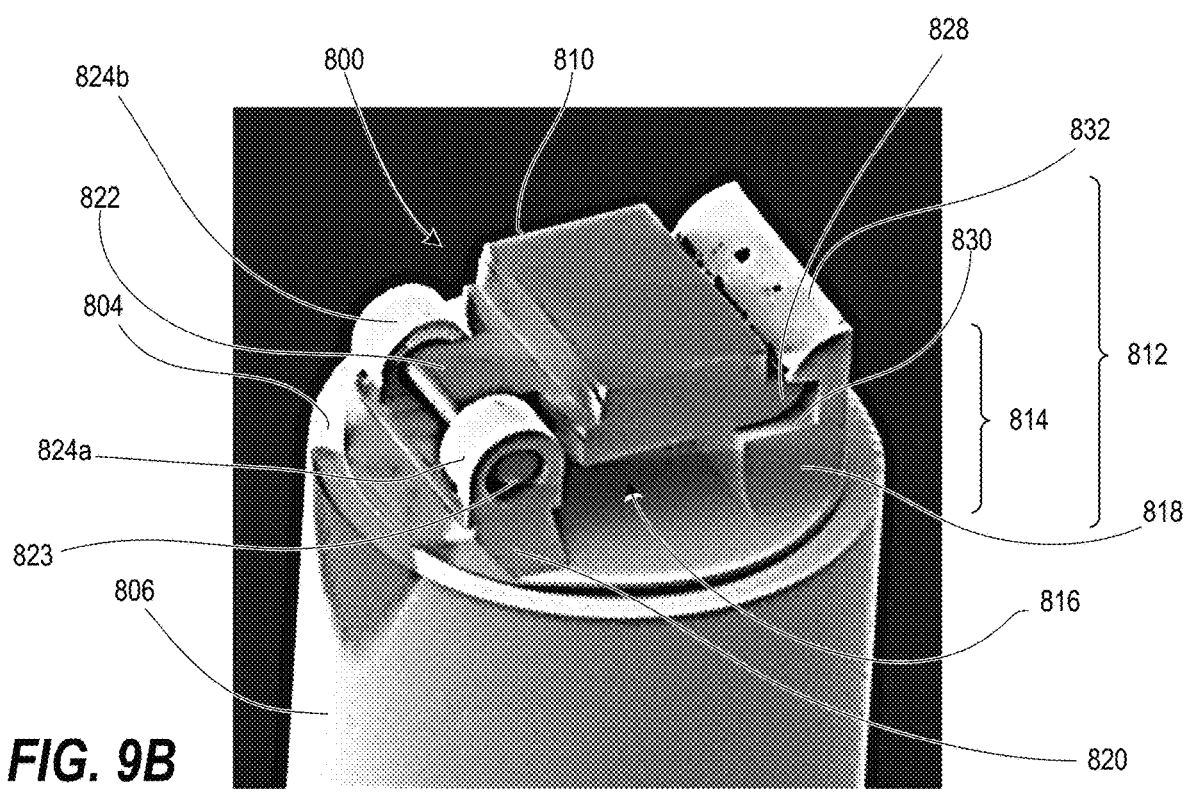
FIG. 9B depicts a three-dimensional SEM image of the passive microscopic FPI sensor having the hinged mirror surface in a closed position, according to one or more embodiments.
Figure 10:
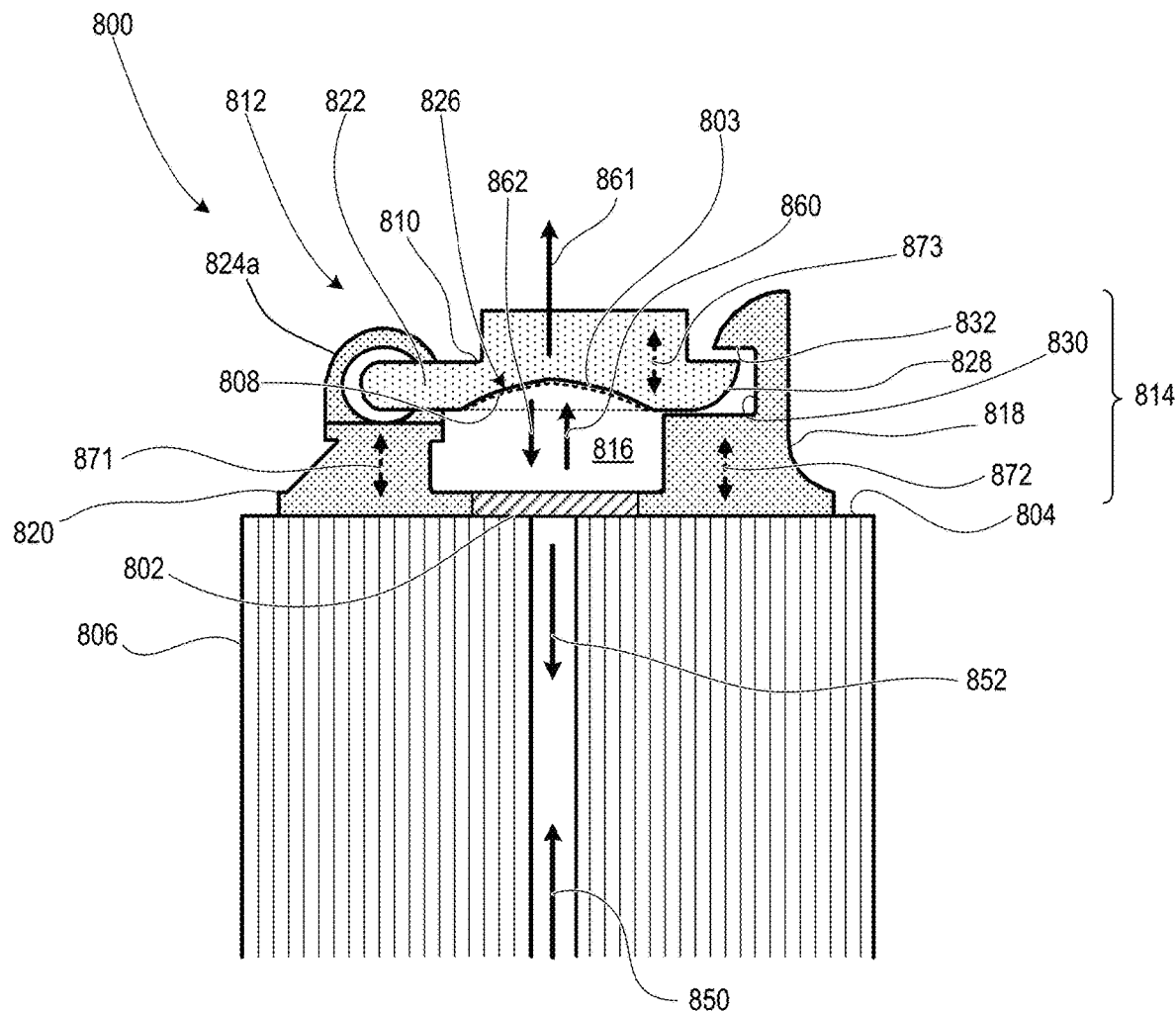
FIG. 10 depicts a side cross sectional view of the passive microscopic FPI sensor with the hinged mirror surface in the closed position, according to one or more embodiments.

FIGS. 9A 9B and 10 depict a passive microscopic FPI sensor 800 that enables secondary processes to apply reflective materials on an interior cavity surface. FIG. 9A depicts a three-dimensional scanning electron microscope (SEM) image of the passive microscopic FPI sensor 800 can have a proximal reflective layer, such as a flat mirror 802 (FIG. 10) that is applied to a cleaved tip 804 of an optical fiber 806. A distal reflective layer 808 (FIG. 10) can be applied to a concave surface 803 on an inner side of a hinged optical layer 810 that is distally spaced from the optical fiber 806. FIG. 9B depicts a three-dimensional SEM image of the passive microscopic FPI sensor 800 having the hinged optical layer 810 in a closed position. FIG. 10 depicts a side cross sectional view of the passive microscopic FPI sensor 800 with the hinged optical layer 810 in the closed position. With particular reference to FIG. 10, the FPI sensor 800 includes a three-dimensional microscopic optical structure 812 formed on the cleaved tip 804 of the optical fiber 806 using a two-photon polymerization process on a photosensitive polymer by a three-dimensional micromachining device. The three-dimensional microscopic optical structure 812 includes a suspended structure 814 defining a cavity 816 with the cleaved tip 804. The hinged optical layer 810 is pivotally connected to a distal portion of the suspended structure 814. In one or more embodiments, the suspended structure 814 is provided by engagements of the hinged optical layer 810 by a latch mechanism 818 and a hinge stand-off structure 820 that cooperatively space the hinged optical layer 810 from the cleaved tip 804. The hinged optical layer 810 includes support material 822 that has a rotating pin 823 engaged to left and right pin housing 824a-824b that extend distally from the hinge stand-off structure 820. The hinged optical layer 810 is subsequently positioned in the closed position to align reflection mirror 826, formed by the distal reflective layer 808 on the concave surface 803, to at least partially reflect a light signal back through the optical fiber 806. A thinned engagement edge 828 extends from hinged optical layer 810 on an opposite side to the support material 822. The latch mechanism 818 has an inward horizontal channel 830 that receives the thinned engagement edge 828 when ramped actuating structure 832 is initially defected outward and then resiliently engages a top edge of the thinned engagement edge 828.

In use, incident light 850 is guided by the optical fiber 806 to the cleaved tip 804 of the optical fiber 806. Some of the incident light is reflected at the proximal reflective layer 802 on the cleaved tip 804 of the optical fiber 806, returning up the optical fiber 806 as returning light 852 with a portion continuing distally within the cavity 816 as distally moving light 860 within cavity 816. A portion of the resonant wavelengths of the distally moving light 860 passes through the distal reflective layer 808, the hinged optical layer 810, and exit the FPI sensor 800 as transmitted light 861. Some of the light reflects off of the distal reflective layer 808 returning as proximally moving light 862 within the cavity 816 toward the proximal reflective surface 856. Some of the proximally moving light 862 continues on as part of the returning light 852. Another portion can be reflected again within cavity 816. The wavelengths that resonate within the cavity 816 depend on the internal longitudinal dimension of the cavity 816 and refractive index of fluid within the cavity 816.

In one or more embodiments, the passive microscopic FPI sensor 800 has hinge stand-off structure 820 and latch mechanism 818 that longitudinally extend and retract symmetrically as depicted by arrows 871-873 in relation to ambient temperature to vary the reflected light 852 as a temperature signal. In one or more embodiments, the cavity 816 is filled with a gas that is altered by ambient thermal radiation to change a refractive index that varies the reflected light 352 as a temperature signal. In one or more embodiments, the cavity 816 is filled with a gas that can be altered by varying amounts of volatile organic compounds from an ambient environment to change a refractive index that varies the reflected light 352 as a temperature signal.

Figure 11:
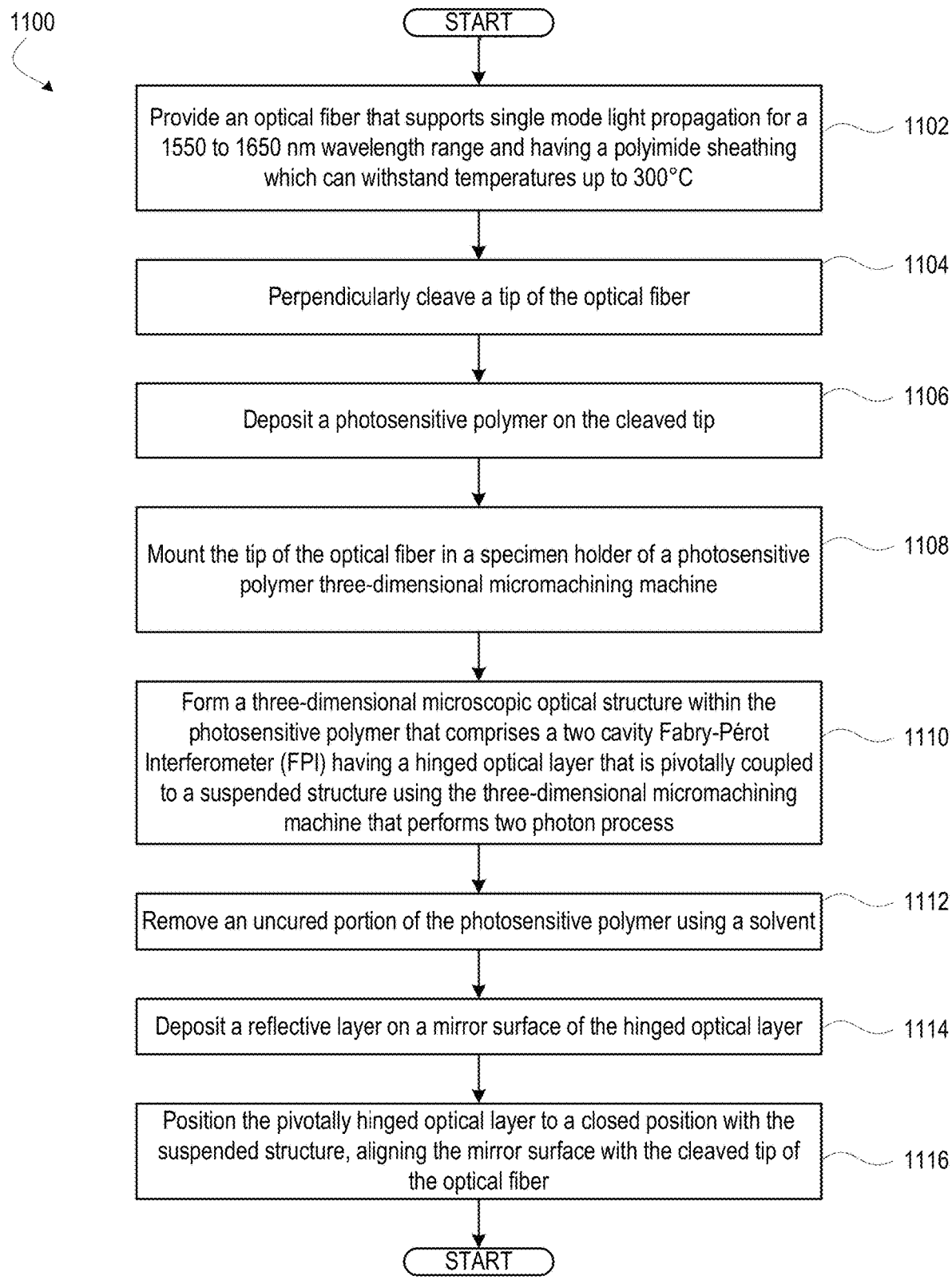
FIG. 11 depicts a flow diagram of a method for fabricating a hinged passive optical sensor on a tip of an optical fiber, according to one or more embodiments.

FIG. 11 depicts a flow diagram of a method 1100 for fabricating a hinged passive optical sensor on a tip of an optical fiber. Method 1100 includes providing an optical fiber that supports single mode light propagation for a 1550 to 1650 nm wavelength range and having a polyimide sheathing which can withstand temperatures up to 300° C. (block 1102). Method 1100 includes perpendicularly cleaving a tip of the optical fiber (block 1104). Method 1100 includes depositing a photosensitive polymer on the cleaved tip (block 1106). Method 1100 includes mounting the tip of the optical fiber in a specimen holder of a photosensitive polymer three-dimensional micromachining machine (block 1108). In one or more embodiments, method 1100 includes mounting the tip of the optical fiber in the specimen holder by attaching a fiber chuck over a semiconductor wafer opening in a specimen tray. Method 1100 includes forming a three-dimensional microscopic optical structure within the photosensitive polymer that comprises a two cavity Fabry-Pérot Interferometer (FPI) having a hinged optical layer that is pivotally coupled to a suspended structure using the three-dimensional micromachining machine that performs two photon process (block 1110). Method 1100 includes removing an uncured portion of the photosensitive polymer using a solvent (block 1112). Method 1100 includes depositing a reflective layer on a mirror surface of the hinged optical layer (block 1114). Method 1100 includes positioning the pivotally hinged optical layer to a closed position with the suspended structure, aligning the mirror surface with the cleaved tip of the optical fiber (block 1116). Then method 1100 ends.

The present innovation explores one promising fabrication technique for creating low SWAP sensors, two-photon polymerization (2PP) micro-fabrication. This process is able to create unprecedented sub-micron resolution 3D mechanical structures easily and quickly. Capt John Smith, previous AFIT graduate, was also able to integrate 2PP micro-fabrication with low loss optical fibers. This work aims to expand upon Capt Smith's success to further leverage the 3D freedom afforded by this process to create low SWAP sensors for potential defense applications.

The Air Force also has an interest in miniaturizing aircraft and aircraft components. A ubiquitous parameter to monitor on an aircraft is pressure. First, the altitude of an aircraft can be determined by the pressure of the atmosphere around it. Miniaturized aircraft could self-reference their altitude with a miniaturized barometric pressure sensor to increase their autonomy. Second, it is critical to understand the pressure at specific points inside a jet turbine to ensure its optimal performance. Miniaturized pressure sensors could provide multiple data points inside a turbine without seriously altering the overall geometry. An improved understanding of the pressure situation inside a turbine during its operation can inform operators on how to improve its efficiency and performance. The extreme temperature conditions inside a jet engine also poses a continuing challenge that warrants examining different sensing schemes. This document presents a micron-scale optical fiber environmental pressure sensor that could be explored for various pressure-sensor applications that would benefit from miniaturization.

1.1 Assumptions/Limitations. The main limitation of this work was choosing a single fabrication technique to investigate. Several methods have been demonstrated to produce optical fiber based sensors as discussed in section 2, but this work only considers two photon polymerization. This method requires devices are fabricated from the bottom up, and must be supported during polymerization. This greatly influenced the design of each device. Additionally, only one 2PP lithography system was used, the Nanoscribe GT Photonic Professional.

Testing was also limited by the scope of this research, with the vast majority taking place at AFIT to ensure timely completion. The variable wavelength laser utilized had two issues that were overcome with software: its wavelength-dependent output power and the mechanical vibrations caused by its motor during a sweep. The software solutions are discussed further in section 3. Upgrades to testing equipment such as the flow meter, vacuum chamber, and hotplate may provide superior data as well, but required too long to implement. General assumptions were made regarding environmental properties of the testing lab including relative humidity, ambient temperature, and atmospheric pressure. The refractive index of each test is also assumed to be constant over the bandwidth of interest. Calculations for optical properties when a specific wavelength was not known were made at 1550 nm.

1.2 Contributions. Contributions from this work to the defense-focused research of AFIT include: (i) Demonstrated advanced capabilities of two-photon polymerization microfabrication, an emerging field offering unparalleled design freedom at the sub-micron scale; and (ii) Realized a microscopic high-deflection spring-body on the tip of an optical fiber that deflections in response to external ambient pressure.

1.3 Document Overview. The hinged spring-body pressure sensor 100 (FIG. 1) was intended to leverage the mechanical success of the hinged FP cavity and the 3D freedom afforded by the 2PP micro-fabrication technique. Instead of measuring pressure by refractive index change, this device captured a small pocket of atmosphere during fabrication. When placed in the vacuum chamber, the pressure differential caused the pocket to expand. This technique is popular in MEMS pressure sensors, and has been demonstrated on several fiber-tip sensors as well [1, 2, 3, 4, 5, 6]. The hinged bellows sought to use a spring body to increase deflection from differential pressure. The spring body could not be fabricated with traditional semiconductor fabrication techniques, and highlights the versatility of 2PP microfabrication. The expansion of the cavity alters which wavelengths resonate and transmit through the device.

2 BACKGROUND AND LITERATURE REVIEW 2.1 Fabry-Pérot Cavity. Pressure sensor 100 (FIG. 1) has the optical behavior of a Fabry-Pérot cavity resonator. The Fabry-Pérot (FP) cavity is an important optical element consisting of two semi-silvered mirrors parallel to each other, separated by some interstitial medium such as air or vacuum. A portion of light incident onto the cavity transmits through the first mirror into the interstitial medium. The light is reflected multiple times inside the cavity between the two mirrors. Specific wavelengths of light transmit through the cavity if they experience coherent interference with their reflected beams. This multiple beam constructive interference along the optical axis is also called the longitudinal resonance mode. Resonance occurs when the phase shift of the reflected light is a multiple of $\pi$. The wavelengths this occurs at depends on the physical properties of the resonator, an is determined by:

$$\lambda_m = m\frac{c}{2nl} \qquad \text{Eqn. 1}$$

where m is the integer longitudinal mode order, n is the refractive index (RI) of the interstitial medium, and l is the length of the FP cavity [7]. Non-resonant wavelengths are reflected by the cavity. This leads to the traditional wavelength dependant transmission spectrum. An FP laser cavity is made by inserting a gain medium such as a gas, semiconductor, or opto-fluidic dye, into an FP cavity. Input light excites optical resonance inside the gain medium which constructively interferes with its own emissions to create a coherent transmission out of the cavity in the form of a laser beam [8].

The FP cavity has several key aspect that make it a powerful tool for micro-optics. It exhibits the longitudinal resonance mode very strongly, leading to a small mode volume compared to other optical resonators such as photonic crystals, distributed feedback gratings, and whispering gallery mode ring resonators [9]. Very high quality factors have also been reported with micro FP cavities. The quality factor of an FP cavity's response is defined as, $$Q = \frac{\lambda_0}{\Delta\lambda_{FWHM}} \qquad \text{Eqn. 2}$$

where $\lambda_0$ is the resonant wavelength of interest and $\Delta\lambda_{FWHM}$ full width half max (FWHM) of the peak feature. The FWHM is related to another figure of merit often used for FP cavities, the finesse. This is defined as, $$f = \frac{\Delta\lambda_{FSR}}{\Delta\lambda_{FWHM}} \qquad \text{Eqn. 3}$$

where $\lambda_{FSR}$ is the distance between two resonant wavelengths, or the free spectral range (FSR). For a given resonant wavelength at normal incidence, the FSR can be predicted from the cavity properties, $$\Delta\lambda_{FSR} = \frac{\lambda_0^2}{2nl} \qquad \text{Eqn. 4}$$

where $\lambda_0$ is the resonant wavelength, l is the length of the cavity, and n is the RI of the cavity.

The finesse of a cavity, and therefore the FWHM and quality factor, is related to the reflectance of the mirrors through the coefficient of finesse:

$$f = \frac{\pi\sqrt{F}}{2} \qquad \text{Eqn. 5}$$

$$F = \left(\frac{2\sqrt{R}}{1-R}\right)^2 \qquad \text{Eqn. 6}$$

where f is the finesse, F is the coefficient of finesse, and R is the reflectance of the cavity mirrors [7]. Taking advantage of this relationship, quality factors as high as 105 have been achieved on micro-FP cavities by using stacked dielectric mirrors [10].

The cavity of an FP resonator can also be open to the environment. This allows different interstitial media to be interrogated or used as a gain medium. Additionally, the FP cavity does not require a different RI inside and outside the cavity, as is required in the ring resonator [11]. While an open cavity increases the utility of a device, it also leads to losses due to poor lateral confinement. After several reflections, resonant light eventually bleeds off the edge of the mirror and is lost. This problem is amplified when the two mirrors are misaligned. Even a few degrees of misalignment has been shown to have detrimental impact on the quality factor of a device [10]. One popular way to reduce misalignment sensitivity and improve lateral confinement is to use curved mirrors [12, 13, 11], although this usually makes fabrication more complicated. The manufacturing technique investigated in this research, two-photon polymerization (2PP), makes fabrication of such features very simple, and will be discussed further in subsection 2.4.

These advantageous qualities have made the FP cavity the cornerstone of many exciting applications. Used as a laser cavity, researchers have examined several exotic gain mediums such as biological tissues [14], optical fluids [10, 11], and silicon nanowires [15]. Microelectromechanical systems (MEMS) have been integrated with an FP cavity to create both tunable optical filters [16], and miniaturized tunable lasers [17, 18]. Open FP cavities are also powerful tools for spectroscopy. They have been used in human breath analysis [19], microfluidic interrogation on a microchip [20], compact imaging spectrometers [21], and the interrogation of living cells [22]. The FP cavity is also key to cavity quantum electrodynamics (CQED), the physics behind quantum computing. It has been used to couple to a trapped atom [23], for frequency splitting of polarization eigenmodes [24, 25], and as a highly controlled photon emission source [26, 12]. Finally, the response of an FP cavity can be used to sense any phenomenon that effects the RI or length of the cavity. As shown in equations 1 and 11, both the resonant wavelengths and the FSR of the response will be affected by changes in RI and cavity length. This relationship has been used to sense many phenomenon including force [27], temperature [28], liquid RI [29], pressure [4], gravitational waves [30], acceleration [31], and gas composition [32]. One powerful platform for micro-FP sensors is the optical fiber due to its low optical losses, small form factor, and well known mode structure [33].

2.2 Optical fibers. The optical fiber is an integral component of modern photonics. Since the late 1800s, the controlled propagation of light by total internal refraction has been demonstrated through streams of water or glass "light pipes" [8]. These early demonstrations have evolved into modern optical fibers. With the invention of the laser, guiding light has become a high priority research area for both commercial and defense applications.

To guide light, an optical fiber relies on the phenomenon of total internal reflection. This occurs when light originating inside a medium of higher RI reflects off of an interface with a a medium of lower RI at an angle beyond its critical angle. Optical fibers consist of two layers of glass, a core and a cladding. The core has slightly higher RI than the cladding, thus trapping and propagating light incident to the cladding at an angle beyond its critical angle. This angle is determined by the RI of the cladding $n_{cl}$ and the RI of the core $n_{co}$, [33], $$\sin \theta_c = (n^2_{co} - n^2_{cl})^{1/2} \qquad \text{Eqn. 7}$$

Light entering the fiber below this angle is propagated within the fiber by total internal reflection between the core and the cladding. Typically, this glass is covered in a protective polymer jacket to prevent the fiber from breaking when bent.

There are several types of optical fiber, defined by the nature of the light they propagate [34]. The most common commercial fibers are multimode stepped-index, multimode graded-index, and single mode step index. Graphical plot and diagrams of the three common types of commercial optical fibers are generally known [35]. Maxwell's equations in cylindrical coordinates show that only specific modes will propagate based on the geometry of the fiber as shown in [33]. The number of propagated optical modes, the mode volume, is found to be [33]:

$$V = \frac{2\pi an}{\lambda}\sqrt{2\Delta} \qquad \text{Eqn. 8}$$

$$\Delta = \frac{n^2_{co} - n^2_{cl}}{2n^2_{co}} \qquad \text{Eqn. 9}$$

where a is the diameter of the fiber core and λ is the wavelength of incident light. Step indexed fibers simply a different RI in the core and cladding. If the core is large enough to allow many modes, some will propagate at a slightly different angle based on their angle of incidence. This leads to different optical path lengths for different modes, resulting in a time delay upon exiting the fiber. This is a problem for data transfer, which relies on precise timing to discern each bit of a transmission. to combat this, graded index fibers change index more gradually. This reduces the number of allowed modes by occasionally focusing the propagating light. The highest information bandwidth can be achieved with single mode fiber. This fiber uses a small core on the order of the wavelength of the incident light, typically 9 µm for 1550 nm light, to constrain the number of allowed modes. The geometry only allows light to propagate down the axis of the fiber. The conditions for single mode operation occur when equation 8 is less than 2.405 [33]. When only a single mode is present, all light exiting can be precisely timed to hold the most data. This also greatly reduces the noise from the different reactions of multiple modes when optical fibers are used as sensors [33]. This work uses single mode optical fibers.

Optical fibers can achieve with very low losses, which is demonstrated in their dominance of long distance telecommunications. Signals carried on ordinary copper wires must be re-amplified about every kilometer, and coaxial cables about every 2-6 km. Modern optical fibers require re-amplification only after 80 km [8]. For fiber based sensors, this opens the possibility of extremely remote operation. The expensive and bulky analysis equipment could be centrally located kilometers away from the sensors themselves. Additionally, this efficiency leads to less bulky re-amplifier hardware, giving optical fiber communications lower size, weight, and power (SWAP) than traditional wired connections. The lower hardware requirement combined with the small, light, micron-scale dimensions of most fibers make them attractive for the military's low SWAP platforms such as aircraft and satellites [34].

Fiber optics are also capable of carrying more information than electrical, radio, or even microwave communications. This is because the available bandwidth of a communication system increases with the frequency of the carrier signal. The high frequency (small wavelength) light used for optical fibers can, in theory, exceed the information capacity of microwave communications by a factor of 105 [34]. The Pacific Light Cable Network Fiber, a submarine transpacific data link, transmits 144 terabits/s using six pairs of commercial fiber optic cables [36]. In the state of the art, researchers have been able to reach a record 10 petabits/s over 11.3 km using a single highly customized multi-core fiber [37].

Fiber optics are also immune to electromagnetic interference and the effects of an electromagnetic pulse, making them more robust than electrical signal carrying wires [34]. This is particularly valuable to military applications, where communication lines may be targeted by EM attacks. Fiber optic communication is also highly secure. While radio and microwave signals can be intercepted passively and discretely, the light propagated by an optical fiber is entirely contained. The line would need to be cut into, immediately notifying the intended recipient the communication was being tampered with when they failed to receive the message [34]. This is beneficial to military systems where the security of real-time data can be key to battlefield success. Such benefits make fiber optics an attractive possible compliment to wireless communication for secure military communications.

2.3 Two-Photon Polymerization (2PP) Micro-Fabrication. An important enabling technology for this work is two-photon polymerization 3D. This technique begins with a drop of photosensitive resin is placed on a substrate. The chemical make-up of the resin allows it to polymerize into a solid, but only when exposed to a high threshold energy and absorbing two photons from a light source. This stringent polymerization requirement allows a laser beam to achieve a resolution smaller than the width of the beam, as only the very peak of the beam has the requisite energy to solidify the resin [38].

Advances in femtosecond laser technology provided an ideal laser source. These UV lasers can be focused to small diameter beams and pulsed with precise timing. Combined with state of the art galvanometric and piezoelectric motion control, the femtosecond laser is capable of solidifying the UV curable resin with a resolution around 100 nm. Software known as a slicer deconstructs a 3D model into layers, which are polymerized one at a time to construct the desired structure surrounded by undeveloped liquid resin. This resin is rinsed away in solvents, leaving behind the solidified structure.

This technique allows for true 3D freedom compared to the planar semiconductor fabrication techniques often used in MEMS fabrication. Previously impossible models and mechanical parts have been demonstrated on a sub-micron scale. Arbitrary curved geometries such as statues and figurines are shown in [39] and [40]. Meta-materials can be made with new shapes, unachievable with any other method. Recent examples are collected in [41]. Devices made by 2PP have demonstrated high optical quality and can be integrated with CMOS technology as demonstrated by the compound microlenses in [42]. There have even been impressive demonstrations of remote control of moving parts such as gears and levers by optical force [43], and magnetically by polymerizing a ferrofluid resin [44]. Devices are known to be produced utilizing 2PP micro-fabrication. (a) Optically driven micro-gear [43] (b) Statue demonstrating curvature [39]; and (c) Compound micro-lens integrated with a CMOS optical sensor [42].

2.4 Two-Photon Polymerization onto Optical Fibers. Optical fibers present a natural and powerful platform for 2PP micro-fabrication. A fiber's optical signal can easily interact with the polymer structures, the end of a fiber can be precisely cleaved to provide a flat substrate, and the standard fiber dimensions encourage device geometry that can be fabricated in a matter of minutes. A range of optical and mechanical devices have been fabricated onto optical fibers, showcasing their natural synergy with 2PP micro-fabrication.

The immediate access to the guided light output by an optical fiber makes fabricating optical elements a natural choice. Anti-reflective metamaterials can be integrated directly onto an optical fiber as shown by [45] and [46]. Lenses are also a promising component, with successful demonstrations of imaging multi-lens objectives [47], increased numerical apertures [48], and collimators [49]. Other devices include whispering gallery mode resonators [50, 51], photonic crystal structures [52, 47], a polarization controller [53], Mach-Zehnder Interferometers [54, 55], optical tweezers [56], and Bragg gratings [57]. Some devices take great advantage of the 3D freedom afforded by 2PP micro-fabrication to build impressive mechanically enabled structures. Examples include a force-sensitive microgripper [58], and a miniature microphone [59]. This work strives to similarly leverage 2PP micro-fabrication to mechanically enable sensors.

The FP resonator, of particular importance to this work, is another popular optical device for 2PP micro-fabrication onto fiber tips. They provide all the benefits as a resonator discussed in subsection 2.1. An FP cavity can be polymerized with liquid resin still inside of the cavity [60], but the resin will slowly polymerize if exposed to UV light, and the cavity is closed off to the environment. Several open resonators, very comparable to this work, were fabricated onto conventional substrates, then attached to an optical fiber with optical adhesive as shown in [61] and [57]. While an impressive fabrication feat, this additional step and possible misalignment can be avoided by fabricating directly onto the fiber. On-fiber FP resonators comparable to this thesis are presented in [62] and [63]. Scanning electron micrographs of several devices fabricated by 2PP onto optical fibers are generally known: (a) Open FP Cavity RI Sensor [63]; (b) Whispering gallery mode resonator [51]; (c) Force-sensitive microgripper [58]; and (d) Woodpile photonic crystal structure [52].

2.5 Fiber Optic Sensors 2.5.1 Bragg Gratings. Fiber Bragg grating and graphical plots of transmission spectrum of Bragg gratings are known [65]. Fiber Brag gratings (FBGs) have been made since the 1990s by creating a pattern of lines with different RI inside the core of an optical fiber. This grating pattern is transparent to most wavelengths, but reflects a certain wavelength whose optical path interacts with the dimensions of the grating to interfere coherently, much as in a FP cavity. This wavelength is determined by Bragg's law [64]:

$$\lambda_B = 2n_{eff}\Lambda \qquad \text{Eqn. 10}$$

This wavelength will shift when the fiber housing it is exposed to various stimuli, most notably strain and temperature. A variable wavelength laser source is coupled to a fiber containing a grating through an optical circulator, a device discussed in section 3. The grating reflects one wavelength based on its strain and temperature, and changes in these factors change the wavelength that is reflected. This resonant wavelength is monitored to determine a change in the sensed parameter. Considerable work has been done to characterize and improve these sensors.

Being contained within their optical fiber, FBGs are particularly robust without requiring additional packaging. This, in addition to the EM immunity experienced by all fibers, allows them to be used in hostile environments where other sensors may not survive or function properly. The additional protection limits direct interaction with the environment, limiting the parameters that can be sensed by FBGs. Creative engineering has been able to transduce some external factors into temperature or strain, such as the coating used by [64] to introduce strain when exposed to hydrogen, but such solutions are rare. Further reading on FBG sensors can be found in [66, 64, 67, 68, 69]. While important devices, this work utilizes FP cavity and simple reflectors for sensing as opposed to FBGs.

Spliced Fibers: One method for creating a micro-scale FP cavity is to splice together different optical fibers. Precise and repeatable fiber splicing is achieved by first cleaving the end face of each fiber, carefully aligning these faces, and effectively arc-welding them together. Researchers have built FP cavities by splicing a traditional fiber to a hollow core fibers (HCPs) with some kind of membrane or cap on the end. This technique has been demonstrated as an airflow sensor, capped with another length of SMf [70]. Sensors have also been made that can interact with the environment such as a moisture-sensitive cap of chitosan used as a humidity sensor [71]. Spliced fibers coated with sensitive materials have also measured volatile organic compounds in polluted soil [72]. A sensor has even been reported utilizing three types of fiber spliced together. A SMF is spliced to a HCF which acts as the cavity body and is spliced to a perforated photonic crystal fiber (PCF). The small waveguide holes of air in the PCF allow gas to enter the cavity, changing its RI and reflection response [73]. Another creative use of fiber splices used an intentional defect on the surface of the fiber caused by a femtosecond laser to create a bubble during the splice [74]. This also created a curved mirror surface in the FP cavity, gaining the benefits discussed in subsection 2.1. This device was able to sense RI and temperature change. Another technique involved splicing off the end of an attached HCF to create a closed bubble of air inside the glass [75]. Spliced fiber sensors are known: (a) Glass bubble by splicing around a defect caused by a femtosecond laser [74]; (b) glass bubble by splicing the end of a HCF [75]; and (c) RI sensor with three different fiber types spliced together [73].

The main problem with splicing multiple types of fibers is repeatably. The process often involves time-consuming setups, and the splice may be different every time. This could change device geometry, or cause failures. The 2PP microfabrication used in this research is highly repeatable and allows for arbitrary geometries not limited by the functional dimensions of fiber splices.

2.5.3 Subtractive Manufacturing. Another promising method for fabricating fiber tip sensors is subtractive manufacturing by removing portions of the fiber. This technique enables high precision FP cavities that are open to the environment. It is possible to simply remove part of the fiber with a femtosecond laser, and create an opening to serve as a cavity and sense temperature [76, 77] as well as RI changes of an interstitial medium [78]. A similar technique uses a focused ion beam (FIB) to remove material. Cavities formed by a FIB have been demonstrated on a 10 μm tapered fiber [79, 68], and combined with a bi-metallic coating [80] to produce temperatures sensors. A more complicated fabrication scheme used hydrofluoric acid (HF) to selectively etch the cores of two different fibers to achieve smaller cavities in a dual temperature and pressure sensor [81]. A very promising method uses a femtosecond laser to degrade part of the fiber, which is then etched away with HF [82]. The degrading portion of the laser beam can be scanned through the fiber at any height to achieve 3D freedom. The size of features made with this process is still limited, as the HF etches selectively, not exclusively. Precise timing and careful planning is necessary to account for the etching into the unexposed features. The surface finish of the etch is also rather poor. Lack of precise control is the main constraint on subtractive manufacturing. Glass also presents some problematic material properties, being brittle and rigid compared to most 2PP photoactive resins. Sensors are known to be made with subtractive manufacturing: (a) Femtosecond laser and HF to create a free cantilever [82]; (b) Bragg grating on a tapered fiber made with FIB milling [68]; and (c) A groove FP cavity made with femtosecond laser micromachining [76].

2.5.4 Additive Manufacturing. The final fabrication technique to be discussed is additive manufacturing. The 2PP micro-fabrication used in this work is additive manufacturing in the purest sense, but other notable techniques have been demonstrated. The simplest method carefully places a droplet of UV-curable optical adhesive onto a cleaved fiber to create a dual temperature and pressure sensing FP cavity [5]. While very limited in possible geometries, this work establishes a precedent of precision optical adhesive application, which is used in this research. Other demonstrations of optical adhesive use another fiber to mold an adhesive cavity [3], glue a capillary tube around a cleaved fiber to build a pressure sensor [2], create a domed cover to a spliced HCF for another pressures sensor [1], and adhere a fiber to a silicon based photonic crystal mirror to make an acoustic sensor [83]. Incorporating silicon chips is particularly interesting for integrating with CMOS technology and leveraging standard semiconductor fabrication processes. Specifically, deposition techniques such as magnetron sputtering [3, 2, 84], thermal evaporation [85], e-beam evaporation [83], chemical vapor deposition (CVD), and atomic layer deposition (ALD) can deposit reflective materials to increase the quality of an FP cavity's response as discussed in subsection 2.1. The popularity of sputtering is likely due to its conformal, rapid deposition and relative ease of operation. Sputtering was also used in this work, with specific settings included for each device in their respective fabrication sections. Several adhesive-based fiber tip sensors are known: (a) A polymer droplet cap to a spliced fiber [1]; (b) A capillary tube adhered around an optical fiber [2]; and (c) An adhesive molded cavity [3].

Adhesive based sensors are primarily limited in their geometry. The glue is either molded, or another part is attached, both of which constrain the shape of any device. True 3D freedom is achieved by using some form of sterolithography to solidify a photoactive polymer resin layer-by-layer. One group was able to create a custom system that sprays a layer of photoresist, selectively exposes the layer, and repeats to construct impressive 3D features [86]. The process is rather time consuming, and limits on the x, y, and z resolution are set by the quality of the exposure and layer deposition respectively. The purpose-built solution is a 2PP micro-fabrication system, which is discussed in subsection 2.3. An innovative method for integrating 2PP micro-fabrication with optical fibers is to create a device on a planar substrate and adhere it to a fiber [61, 55]. This allows the 2PP system to be used without modification, but adds considerable complexity to the fabrication and limits the possible features at the face of the fiber. With some minor modifications, it is possible to perform 2PP micro-fabrication directly onto the cleaved face of an optical fiber. Fiber tip sensors utilizing this technique include open FP cavity RI sensor [63], a radar-like surface enhanced Raman scattering sensor [85], a WGM resonators for vapor interrogation [50] and temperature sensing [51], a Mach-Zehnder interferometer RI sensor [54], a fluid filled cavity temperature sensor [60], and a micro-scale microphone with spring bodies [59]. Known fiber tip sensors made with 2PP micro-fabrication include: (a) surface enhanced Raman scattering sensor [85]; (b) Mach-Zehnder interferometer RI sensor [54]; and (c) a Mach-Zehnder interferometer fabricated on a planar substrate and adhered to a fiber [55]. This research aims to expand on this work to take full advantage of the 3D freedom afforded by 2PP micro-fabrication to enable fiber optic sensors.

3 METHODOLOGY 3.1 Operating Principle. The reflection response of a FP cavity, as discussed in 2.1, is determined by the physical properties of the cavity and the wavelength of the incident light. An important and easily measured metric is a cavity's free spectral range (FSR), which is the wavelength shift between two resonance features. FP resonator interaction occurs inside the pressure sensor 100 (FIG. 1). The FSR of a cavity is [8], $$\Delta\lambda_{FSR} = \frac{\lambda_0^2}{2nl} \qquad \text{Eqn. 11}$$

where $\lambda_0$ is the central resonant wavelength, n is the refractive index (RI) of the medium inside the cavity, and l is the length of the cavity.

Another important property of an FP cavity, its optical path length can be calculated from two of these resonant peaks with [76], $$Ln = \frac{1}{2}\left(\frac{\lambda_{01}\lambda_{02}}{\lambda_{01} - \lambda_{02}}\right) \qquad \text{Eqn. 12}$$

Assuming a constant cavity length, a small change in RI can be determined from the shift of any given resonant wavelength by taking the derivative of equation 12 with respect to n [76]. This yields, $$\Delta n = \frac{\Delta\lambda_0}{\lambda_0} n_0 \qquad \text{Eqn. 13}$$

A small change in the cavity length, assuming constant RI, can likewise be determined by taking the derivative of equation 12 with respect to L, $$\Delta L = \frac{\Delta\lambda_0}{\lambda_0} L_0 \qquad \text{Eqn. 14}$$

The pressure sensor utilizes a pressure differential between the interior and exterior of the device to deflect the spring-body and shorten the cavity length. This can be detected as a shift in resonant frequency. The force acting on the spring body is, $$F = \Delta P A_{top} \qquad \text{Eqn. 15}$$

where only the top area will have a net effect. Pressure will be exerted on the entire wall, but its symmetry will balance the other forces. The displacement caused by this force is found with the spring equation, $$\delta = kF \qquad \text{Eqn. 16}$$

The geometry used for the spring-body is very similar to an assembly of Belleville spring washers in series. This will be used to model the potential deflection. For a single Belleville spring, the force F is related to the deflection $\delta$ by [87], $$F = \frac{E\delta}{MR^2(1-\mu^2)}\left[t^3 + t\left(h - \frac{\delta}{2}\right)(h - \delta)\right] \qquad \text{Eqn. 17}$$

Where R is the outer radius, E is the material's modulus of elasticity, $\mu$ is Poisson's ratio, t is the washer thickness, h is the inner washer height, and M is defined as [87], $$M = \frac{6}{\pi ln A} \frac{(A-1)^2}{A^2} \qquad \text{Eqn. 18}$$

where A is the ratio of the outer diameter to the inner diameter D/d. Most importantly, Belleville spring washers arranged top to bottom in a stack act in series. This reduces the effective spring constant and increases the deflection such that, $$k_{eff} = \left[\frac{1}{k_1} + \frac{1}{k_2} + \ldots + \frac{1}{k_n}\right]^{-1} \qquad \text{Eqn. 19}$$

The spring body of the spring-body pressure sensor contains five Belleville spring washers in series, for greater deflections at lower forces. As the body expands or contracts with the pressure differential, the reflection response of the FP cavity changes. The resonant wavelength will shift with changes in the refractive index or cavity length as previously discussed. Since the spring-body interior is a closed environment, the pressure inside remains constant. The temperature is assumed to be constant as well, making the RI of the air inside the cavity unchanged. This makes a shift in resonant wavelength due to the expansion of the cavity, which can be calculated by equation 14. Thus, by monitoring the change in resonant wavelength, one can determine the deflection of the spring-body. The pressure differential can then be determined if the mechanical properties of the device are known.

3.2 Device Design. The spring body was designed to achieve high deflection with low forces by using multiple springs in series. As shown in equation 15, the thickness of the spring body is an important design parameter with lower thicknesses leading to greater deflection at less force. The body was initially fabricated with a 4 µm thick body, but this was successfully reduced to 2 µm. The device was sturdy enough to withstand fabrication, and greater deflection was achieved. The circular profile of the body was chosen to avoid stress concentrations that would exist at the corners of a polygon-shaped bellows. The same successful hinge and curved mirror used in the hinged RI sensor were used again. A small lip around the edge of the bellows opening provided a resting place for the cap. A latching mechanism was added to improve stability during the sealing procedure. The latching mechanism did not work as intended, but still aided in aligning the top mirror. There was not enough clearance for the latch to spring back over the cap, but the latch bent down and held the cap in place by providing tension against the pin housing. A cross sectional render displays these design features and the multiple internal reflection that occurs inside the cavity.

A brief finite element analysis (FEA) study was performed to estimate the deflection of the spring body and confirm the mode of operation. This was done using COMSOL multiphysics. A simplified model of the device with the hinge and adhesive retaining features removed was used to focus on the reaction of the spring-body. Material properties of the polymerized IP-DIP were supplied by Nanoscribe and other researchers [88]. The properties used are included in TABLE 1. The mesh and simulated deflection at −25 in-Hg where studied as part of this study including estimated displacement in µm. The FEA analysis confirmed the mode of deflection, but estimated higher deflections than were observed. This is discussed in section 4.

| IP-Dip Mechanical Properties for FEA | |
| --- | --- |
| Modulus of Elasticity | 2.91 GPa |
| Density | 1.04 g/cm$^3$ |
| Poisson's Ratio | 0.3 |

TABLE 1. Mechanical properties of polymerized IP-Dip used for FEA, gathered from Nanoscribe and [88].

The device was sealed and adhered to the fiber with Norland optical adhesive 68 (NOA 68). This provided an air-tight barrier to maintain the interior pressure, and kept the device from peeling off of the fiber. Initial plans to paint the adhesive onto the rim of the cap did not work. The adhesive formed beads instead of a thin film when placed on a probe, making precise application difficult. Initial attempts covered most of the spring elements with adhesive as well as the cap. To correct this, a cup and a skirt were added to guide the adhesive around the spring elements. These features functioned as intended, and successfully sealed the device without damaging the spring elements in the body.

3.3 Fabrication. Important features of the fabrication process include: (a) The Nanoscribe GmbH Photonic Professional GT micro-fabrication system; (b) the fiber loaded in the machine; (c) The fiber chuck and custom jig; and (d) IP-Dip resin deposited on the fiber chuck. The devices in this work were fabricated by two-photon polymerization (2PP) the Nanoscribe GmbH Photonic Professional GT micro-fabrication system. First, the optical fibers were cleaved with a Fujikura CT-30 high precision fiber cleaver. They were mounted into a Newport FPH-S side-loading fiber chuck with approximately 1 mm exposed. This was mounted into a custom 3D-printed jig designed by Capt Smith and detailed in [89]. A drop of the Nanoscribe's IP-Dip photoresin was then deposited onto the face of the fiber chuck, surrounding the fiber in resin. The jig was fastened to the 2" wafer plate provided with the Nanoscribe. This plate was used because it at three accessible threaded holes for mounting the fiber. To access the plate, the top light of the Nanoscribe was unscrewed and set aside.

The laser aperture, a custom 63× objective lens, was raised manually to the fiber. The fiber was initially located by following the groove of the fiber chuck. Subsequently, the fiber was mounted in nearly the same location, so it could be approached directly based off of its last known location. A laser employing ultra-short pulses scanned through the resin layer-by-layer according to a computer aided design (CAD) file. The laser used a wavelength of 780 nm, a 80 MHz repetition rate, and a 120 fs pulse duration. The CAD file was first generated in Solidworks, then partitioned into vertical layers by the DeScribe slicer software. Red light from a flashlight was coupled to the fiber to identify the core. A small disk on each device was used as an alignment mark to line up with the core, thus centering the device on the fiber. This was done by focusing the laser inside the fiber where it was still visible, but not polymerizing resin. To ensure adhesion to the fiber face, each print was started approximately 5 µm bellow the surface of the fiber. Thus, it was only necessary to approximately locate the face of the fiber vertically. The Nanoscribe was operated with the NanoWrite user interface. The key settings used for this device are included in TABLE 2. NanoWrite software was used during fabrication: (a) The fiber was located by raising the objective into the resin; (b) The of the fiber was used as an alignment mark; and (c) The laser was scanned through the resin layer-by-layer according to the 3D model, in this case a spring-body pressure sensor was fabricated.

| 2PP Fabrication Settings | |
| --- | --- |
| XY Resolution | 0.2 µm |
| Z Resolution | 0.3 µm |
| Laser Power | 40% |
| Scan Time | 10 mm/s |

TABLE 2. Primary 2PP Fabrication settings input to the Nanoscribe software.

The resin was specially formatted to only solidify after absorbing two-photons of a high energy threshold. This condition only occurred in a small portion of the laser beam, called the voxel (3D equivalent of a pixel). The minimum voxel size advertised by Nanoscribe was 150 nm wide by 150 nm long by 200 nm tall. The voxel size used to fabricate the flow sensor was 200 nm wide by 200 nm long by 200 nm tall. The voxel traced through the design one layer at a time to produce a polymerized structure surrounded by resin. The 2PP fabrication process includes: (a) Photoresin deposited onto a cleaved optical fiber loaded into a fiber chuck with the microscope objective of the Nanoscribe was lowered into the resin; (b) The laser was scanned through layer by layer to polymerize the desired structure; and (c) The remaining photoresin was developed away to release the device. This unexposed resin was developed away by soaking the fiber chuck in propylene glycol methyl ether acetate (PGMEA), also called SU-8 developer. Halfway through the development, the fiber was extended several millimeters for the remaining 10 minutes to ensure no droplets of resin formed around the device. The device was bathed in isopropyl alcohol (IPA) for 10 min to remove the PGMEA. The device was then ready for manipulation or experimentation.

A hinged mirror was included attached to the spring body which was manipulated with a 5 μm diameter semiconductor analysis probe. The hinge allowed a curved mirror to be used in the cap to reduce misalignment sensitivity. The fiber face was exposed and able to receive a similar reflective coating to the top mirror. Fabricating in the open position also enabled the interior of the device to easily cleared of undeveloped photoresin. A cavity could be made full of undeveloped resin, but exposure to sunlight or other UV sources would start to eventually polymerize this interior.

Depositing a reflective coating onto the bellows proved particularly challenging. The cap could be opened as with the hinged RI sensor, but the tall walls of the spring body significantly shaded the core during sputtering. If placed in the center of the process chamber, very little metal would be deposited on the fiber face to make the first mirror. This was corrected by moving the device to the edge of the stage, so that it passed directly under the sputtering target. With this orientation, a recipe was found that improved the reflectance of the cavity. The recipe was not fine-tuned as extensively as with the hinged FP cavity, so only moderate improvement was achieved. Nevertheless, the reflective coating ensured that the dominant resonance features were from the internal cavity. The settings used for the deposition are included in TABLE 3.

| Gold in Lesker Plasma Sputtering System Cathode 1 | |
| --- | --- |
| Cathode Power | 100 Watt |
| Cathode Mode | DC |
| Burn-in Time | 30 Sec |
| Burn-in Pressure | 10 mTorr |
| Deposition Time | 30 Sec |
| Deposition Pressure | 5 mTorr |
| Stage Rotation | 5 RPM |
| Fiber Placement | Edge of Stage |
| Fiber Orientation | Vertical |

TABLE 3. Plasma sputtering deposition settings used for the bellows pressure sensor reflective coating.

The bellows required a unique post-processing step in applying the optical adhesive. This was done by dipping a wire-style 10 μm diameter probe into the NOA 68, then running it along a lint-free paper towel to remove the majority of the adhesive. The remaining beads were small enough to be maneuvered into the cup and skirt features without affecting the spring body of the device. Adhesive was placed in the top cup by lowering the probe directly onto the cap of the device. The bottom was sealed by placing a drop of adhesive on the fiber and guiding it up into the skirt with the probe-tip. It then flowed around the skirt to encompass the entire bottom of the device. The bellows were sealed with optical adhesive: (a) Hinge closed and a bead of adhesive on a probe; (b) top sealed with adhesive; and (c) drop of adhesive on the fiber ready to be pushed onto the skirt.

3.4 Experiment Setup. To measure pressure, the device was mounted inside a Best Value Vacs vacuum chamber. The fiber chuck and holder were used to hold the device again, and placed inside the chamber.

A ¼ in hole was drilled into the acrylic top of the chamber to pass the fiber through. A piece of high density foam was cut and placed around the fiber to seal with the top of the chamber. A compression-fitting port on the chamber was connect to a Thomas 607CA32C electric vacuum pump. A small leak existed somewhere in the vacuum chamber, and a constant pressure was maintained slightly opening the valve to the vacuum pump occasionally throughout a reading. This was done manually by observing the vacuum gauge. The vacuum inside the chamber was varied from 0 in-Hg to −25 in-Hg in increments of 5 in-Hg. Three runs were performed, run one and run two went from 0 in-Hg to −25 in-Hg, where run three went from −25 in-Hg to 0 in-Hg in order to explore hysteresis effects. The test setup was used to test the hinged bellows in a vacuum chamber.

Filters were applied to the reflection data for more accurate analysis: (a) Raw output with power dependent on wavelength; (b) Spectrum after subtracting the power floor; and (c) Equipment-induced ringing filtered out by MATLAB. The variable wavelength laser used had two problematic features that were removed from each measurement by processing the data in MATLAB. First, the laser was designed primarily to operate within close proximity of a single wavelength, not swept over its entire operating range. To this end, only the current could be controlled, so the output power was highly wavelength dependent. This wavelength-dependent floor was removed from the readings for analysis by measuring the response of a blank, cleaved fiber coated in a thick layer of gold, and subtracting this from the reading with a device. The laser motor also introduced a high frequency ringing as it moved. This was particularly problematic as it could shift the location of a "peak" if a dip was read where the true peak should be. The ringing was removed by a moving average filter in MATLAB using 50 points.

4. RESULTS

Before it was used as a sensor, the reflection spectrum of the hinged FP cavity was compared to several popular models to determine device and signal properties. One common model for a Fabry-Pérot cavity is the Airy Distribution [90], $$A = \frac{1}{(1 - sqrtR_1 R_2)^2 + 4\sqrt{R_1 R_2} \sin^2(\varphi)} \quad \text{Eqn. 20}$$

where R1 and R2 are the reflectance values of each mirror, and φ is half of the round-trip phase shift at a given frequency [90], $$2\varphi(v) = 2\pi v \frac{2l}{c} \quad \text{Eqn. 21}$$

where l is the length of the cavity and c is the speed of light. These relationships assume the cavity length, refractive index, and speed of light are independent of wavelength.

Both distributions were fit to the measured spectrum by normalizing the magnitude and inputting the observed resonant peak locations and FSR wavelength shifts. This allowed the curve shapes to be visually compared to extract the reflectance and quality factor. The Airy distribution indicated that the gold coating achieved a reflectance of 0.2. The Lorentzian distribution showed a resonance quality factor of 200. Both of these metrics were significantly lower than the reflectance achieved in other devices in this thesis. The deposition recipe was not thoroughly explored for the bellows device in the timeline of this research, and a different recipe may be able to improve the reflection response. Specifically, several devices were lost before it was discovered they needed to be placed on the edge of the stage during deposition. A slightly longer deposition on the edge would likely improve the response. Analysis of the bellows pressure sensor's reflection spectrum showed: (a) The Airy distribution fit to an excerpt of the response to determine reflectance; (b) the Lorentzian distribution fit to the inverse of the fourth resonant peak to determine the quality factor. The gold coating did serve to isolate the internal cavity as the primary resonator by greatly reducing interference from the top of the cap, which was un-coated.

The FSR of the cavity was calculated and compared with the values predicted by equation 11. Using the measured peak locations as $\lambda_0$, 1.0003 for the RI of air, and the cavity length of 63.66 µm, the FSR between subsequent peaks was estimated. While similarly, the FSR predicted using the ideal cavity length was offset from the measured values. Two factors likely contribute to this, a different RI of air from temperature or humidity, and a slightly taller cavity than intended. As described in subsection 3.3, the laser is focused inside the fiber to a depth of approximately 5 µm to ensure adhesion to the fiber face. This base feature gives the cavity a theoretical length range of 63.66 µm-68.66 µm depending on the skill of the operator. A cavity length of 67 µm aligns much more closely to the measured FSR. This is likely the true cavity length.

The expansion of the cavity in response to the different external pressures shifted the resonant wavelengths of the reflection spectrum as predicted by the optical and mechanical properties of the device. This was confirmed by testing a glued device against an un-glued device. The results of this are included in the appendix. The direction of the resonance shift is also opposite of the shift caused by the change in RI described in section 4, further confirming the shift is caused by deflection in the body rather than a change in RI. The response of the device was linear, but suffered from some variation between experimental runs. This could be caused by creep within the spring body after repeated actions, or slight variations in the vacuum level between runs. As discussed in subsection 3.4, there was a slight leak somewhere in the pressure setup that was compensated manually by opening the valve to the vacuum pump. This could cause slight variations between each run.

Using a linear fit model, the resonant wavelength shifted a total of 2.29 nm over 25 in-Hg of pressure. Inputting the original cavity length of 60 µm and the model's initial resonance peak at atmospheric pressure of 1511.6 nm to equation 14 yields a change in cavity length of 0.091 µm. The linear fit is included in equation 22, and achieved an R2 value of 0.896.

$$\lambda_0 = 0.0916P + 1511.6 \qquad \text{Eqn. 22}$$

The deflection predicted by the FEA simulation was approximately three times larger than the deflection calculated by the linear model. The values of each are included in TABLE 4.

TABLE 4

Bellows deflection predicted by the FEA simulation and the linear model fit to the measured results.

| Pressure | FEA | Linear Model |
|---|---|---|
| −5 in-Hg | 0.056 µm | 0.018 µm |
| −10 in-Hg | 0.112 µm | 0.036 µm |
| −15 in-Hg | 0.168 µm | 0.054 µm |
| −20 in-Hg | 0.225 µm | 0.072 µm |
| −25 in-Hg | 0.281 µm | 0.091 µm |

Factors that likely contribute to this are different material properties in the actual device and different geometric considerations caused by the adhesive, particularly on the top. The mechanical properties of polymerized IP-Dip have been shown to vary significantly with the laser power and scan time used during fabrication [88]. While these devices were fabricated using the recommended settings, they were exposed to additional UV to cure the adhesive. This likely altered the mechanical properties of the device. The adhesive itself is also a significant feature to the device geometry that was not included in the model. The weight of the hinge, cup, and adhesive itself would tend to compress the spring body and lower deflection. It is worth noting that the bellows deflection produced a resonance shift 260% greater than the RI change due to pressure observed in the hinged FP cavity RI sensor.

The results regarding the reflection spectrum and pressure measurements of the spring-body pressure sensor are compiled in TABLE 5.

TABLE 5

Spring-body pressure sensor results.

| Reflection Spectrum Properties | | | |
|---|---|---|---|
| Free Spectral Range (mean) | $\Delta\lambda_{FBR}$ | | 17.184 nm |
| Mirror Reflectance | R | | 0.2 |
| Quality Factor | Q | | 200 |
| Sensing Results | | | |
| | Linear Resonance Shift | Model Slope | Smallest Measured |
| Pressure | ✓ | 0.0916 nm/in-Hg | 5 in-Hg |

5 CONCLUSION

The hinged bellows FP cavity successfully measured pressure changes by altering its resonant frequency. This produced a 2.29 nm shift over 25 in-Hg of vacuum pressure. The spring-body could not be fabricated with traditional planar micro-fabrication techniques, and exemplifies the 3D freedom capabilities of 2PP microfabrication. A reflective coating was achieved despite high aspect ratio, 360 degree side-walls, to utilize a curved mirror for improved alignment insensitivity and to clearly isolate a single resonator from interference with top third wall. Adhesive retaining features were successfully implemented to precisely guide UV curable optical adhesive at the micron scale. A linear shift in the resonant wavelength within the same order of magnitude as a COMSOL FEA simulation was observed. A linear model fit to the data indicates a resonant shift of 0.0916 nm per 1 in-Hg of vacuum. The deflection mechanism also produced a 2.6 times greater shift in resonance than the hinged FP cavity RI sensor. Overall, this proof-of-concept spring-body pressure sensor presents a functional pressure sensor while exploring advanced 3D features made with 2PP microfabrication.

Future work to improve the hinged bellows could include: (i) More robust finite element analysis to optimize the spring body geometry and allowable wall thickness; (2) Further testing at higher vacuums, positive pressures, and finer steps to explore the hysteresis, operational range, fatigue effects, and maximum resolution of the device; and (3) Reflective coating optimization through adjusting the recipe or exploring new materials to further improve the quality factor of the reflection response.

6 APPENDIX 6.1 Software and MATLAB Code. Two nanoscribe programs were used during fabrication, the slicer DeScribe and the machine UI NanoWrite.

The variable wavelength laser sweep was controlled by a Labview-based VI from Sacher Lasertecnik called Motor Motion Controller. This was implimented onto a PC and used to determine the length, speed, and start time of the sweep.

Two free programs were used to create a trigger on the variable wavelength laser. The first was called SoundArb and it controlled the on-board sound card of a PC to create a function generator. The other program was a mouse-macro recorder called Mini Mouse Macro. This was used to record the clicks necessary to start the wavelength sweep and the trigger from SoundArb and repeat them identically for every measurement.

To analyze data, MATLAB was used extensively. Each measurement required a slight changes to the basic program that filtered out the high frequency noise from the laser's motor and located the resonant peaks.

6.2 Spring-Body Pressure Sensor Confirmation Experiment. This test was performed to confirm that the cavity of the spring-body pressure sensor was successfully sealed and not simply changing with the RI of air leaking into the cavity. First, a device was measured with the cap in position but without cured optical adhesive. A small amount of adhesive was placed on the hinge to prevent the top falling open, as the latching mechanism of this device was broken. This un-sealed device was exposed to the test described in subsection 3.4, but starting measurements at −10 in-Hg of vacuum. There is a large initial change as vacuum is applied and the top opens to allow the air inside the cavity to escape. After this, there is no significant trend observable on this scale. The reflection intensity also lowered significantly after vacuum was applied, indicating the top had moved out of alignment.

Next the device was sealed with optical adhesive as described in subsection 3.3. The same test was then repeated. The device exhibited a clearly linear response in the opposite direction as the hinged FP cavity RI sensor. This was taken as confirmation that the spring body was sealed and expanding with different pressures. Additionally, there was no significant loss in reflection intensity at higher vacuum pressures.

6.4 Wavelength Dependent Power of the Variable Wavelength Laser Source. The laser used in this work had wavelength dependent power, which was subtracted from each measurement to flatten the result for more accurate analysis. The value used for this "power floor" was obtained by replacing the device with a cleaved fiber that had a thick reflective coating of gold. The reflection spectrum of this was read three times. The mean was taken as the power floor to be subtracted from subsequent measurements. Wavelength-dependent power of the laser was subtracted from each measurement to flatten the result and improve analysis.

REFERENCES

The following references cited above are hereby incorporated by reference in their entirety:

[1] X. Tan, X. Li, Y. Geng, Z. Yin, L. Wang, W. Wang, and Y. Deng, "Polymer microbubble-based fabry-pérot fiber interferometer and sensing applications," IEEE Photonics Technology Letters, vol. 27, no. 19, pp. 2035-2038, 2015.

[2] S. C. Nesson, M. Yu, X. Zhang, and A. H. Hsieh, "Miniature fiber optic pressure sensor with composite polymer-metal diaphragm for intradiscal pressure measurements," Journal of biomedical optics, vol. 13, no. 4, p. 044040, 2008.

[3] H. Bae, D. Yun, H. Liu, D. A. Olson, and M. Yu, "Hybrid miniature fabry-pérot sensor with dual optical cavities for simultaneous pressure and temperature measurements," Journal of Lightwave Technology, vol. 32, no. 8, pp. 1585-1593, 2014.

[4] M. Yao, X. Ouyang, J. Wu, A. P. Zhang, H.-Y. Tam, and P. Wai, "Optical fiber-tip sensors based on in-situ μ-printed polymer suspended-microbeams," Sensors, vol. 18, no. 6, p. 1825, 2018.

[5] B. Sun, Y. Wang, J. Qu, C. Liao, G. Yin, J. He, J. Zhou, J. Tang, S. Liu, Z. Li, et al., "Simultaneous measurement of pressure and temperature by employing fabry-pérot interferometer based on pendant polymer droplet," Optics express, vol. 23, no. 3, pp. 1906-1911, 2015.

[6] R. K. Poduval, J. Coote, C. A. Mosse, M. C. Finlay, I. Papakonstantinou, and A. E. Desjardins, "3d printed micro-scale fiber optic probe for intravascular pressure sensing," in Biosensing and Nanomedicine XI, vol. 10728, p. 107280B, International Society for Optics and Photonics, 2018.

[7] M. H. Bitarafan and R. G. DeCorby, "On-chip high-finesse fabry-pérot microcavities for optical sensing and quantum information," Sensors, vol. 17, no. 8, p. 1748, 2017.

[8] E. Hecht, Optics, 5e. Pearson Education, 2017.

[9] X. Wu, Y. Wang, Q. Chen, Y.-C. Chen, X. Li, L. Tong, and X. Fan, "High-q, low-mode-volume microsphere-integrated fabry-pérot cavity for optofluidic lasing applications," Photonics Research, vol. 7, no. 1, pp. 50-60, 2019.

[10] X. Wu, Q. Chen, Y. Wang, X. Tan, and X. Fan, "Stable high-q bouncing ball modes inside a fabry-pérot cavity," ACS Photonics, vol. 6, no. 10, pp. 2470-2478, 2019.

[11] W. Wang, C. Zhou, T. Zhang, J. Chen, S. Liu, and X. Fan, "Optofluidic laser array based on stable high-q fabry-pérot microcavities," Lab on a Chip, vol. 15, no. 19, pp. 3862-3869, 2015.

[12] C. Toninelli, Y. Delley, T. Stöferle, A. Renn, S. Götzinger, and V. Sandoghdar, "A scanning microcavity for in situ control of single-molecule emission," Applied Physics Letters, vol. 97, no. 2, p. 021107, 2010.

[13] D. Hunger, C. Deutsch, R. J. Barbour, R. J. Warburton, and J. Reichel, "Laser micro-fabrication of concave, low-roughness features in silica," Aip Advances, vol. 2, no. 1, p. 012119, 2012.

[14] Y.-C. Chen, Q. Chen, T. Zhang, W. Wang, and X. Fan, "Versatile tissue lasers based on high-q fabry-pérot microcavities," Lab on a Chip, vol. 17, no. 3, pp. 538-548, 2017.

[15] X. Duan, Y. Huang, R. Agarwal, and C. M. Lieber, "Single-nanowire electrically driven lasers," Nature, vol. 421, no. 6920, pp. 241-245, 2003.

[16] B. Saadany, M. Malak, M. Kubota, F. Marty, Y. Mita, D. Khalil, and T. Bourouina, "Free-space tunable and drop optical filters using vertical bragg mirrors on silicon," IEEE journal of selected topics in quantum electronics, vol. 12, no. 6, pp. 1480-1488, 2006.

[17] H. Cai, B. Liu, X. Zhang, A. Liu, J. Tamil, T. Bourouina, and Q. Zhang, "A micromachined tunable coupled-cavity laser for wide tuning range and high spectral purity," Optics express, vol. 16, no. 21, pp. 16670-16679, 2008.

[18] J. Masson, R. St-Gelais, A. Poulin, and Y.-A. Peter, "Tunable fiber laser using a mems-based in plane fabry-pérot filter," IEEE Journal of Quantum Electronics, vol. 46, no. 9, pp. 1313-1319, 2010.

[19] M. J. Thorpe, D. Balslev-Clausen, M. S. Kirchner, and J. Ye, "Cavity-enhanced optical frequency comb spectroscopy: application to human breath analysis," Optics Express, vol. 16, no. 4, pp. 2387-2397, 2008.

[20] R. St-Gelais, J. Masson, and Y.-A. Peter, "All-silicon integrated fabry-pérot cavity for volume refractive index measurement in microfluidic systems," Applied physics letters, vol. 94, no. 24, p. 243905, 2009.

[21] M. Pisani and M. Zucco, "Compact imaging spectrometer combining fourier transform spectroscopy with a fabry-pérot interferometer," Optics express, vol. 17, no. 10, pp. 8319-8331, 2009.

[22] W. Song, X. Zhang, A. Liu, C. Lim, P. Yap, and H. M. M. Hosseini, "Refractive index measurement of single living cells using on-chip fabry-pérot cavity," Applied physics letters, vol. 89, no. 20, p. 203901, 2006.

[23] Y. Colombe, T. Steinmetz, G. Dubois, F. Linke, D. Hunger, and J. Reichel, "Strong atom-field coupling for bose-einstein condensates in an optical cavity on a chip," Nature, vol. 450, no. 7167, pp. 272-276, 2007.

[24] S. Garcia, F. Ferri, K. Ott, J. Reichel, and R. Long, "Dual-wavelength fiber fabry-pérot cavities with engineered birefringence," Optics express, vol. 26, no. 17, pp. 22249-22263, 2018.

[25] M. Uphoff, M. Brekenfeld, G. Rempe, and S. Ritter, "Frequency splitting of polarization eigenmodes in microscopic fabry-pérot cavities," New Journal of Physics, vol. 17, no. 1, p. 013053, 2015.

[26] H. Snijders, J. Frey, J. Norman, V. Post, A. Gossard, J. Bowers, M. van Exter,

[27] X. Liu, I. I. Iordachita, X. He, R. H. Taylor, and J. U. Kang, "Miniature fiber-optic force sensor based on low-coherence fabry-pérot interferometry for vitreoretinal micro-surgery," Biomedical optics express, vol. 3, no. 5, pp. 1062-1076, 2012.

[28] J.-1. Kou, J. Feng, L. Ye, F. Xu, and Y.-q. Lu, "Miniaturized fiber taper reflective interferometer for high temperature measurement," Optics express, vol. 18, no. 13, pp. 14245-14250, 2010.

[29] J. Tian, Y. Lu, Q. Zhang, and M. Han, "Microfluidic refractive index sensor based on an all-silica in-line fabry-pérot interferometer fabricated with microstructured fibers," Optics express, vol. 21, no. 5, pp. 6633-6639, 2013.

[30] S. Wise, G. Mueller, D. Reitze, D. Tanner, and B. F. Whiting, "Linewidth-broadened fabry-pérot cavities within future gravitational wave detectors," Classical and Quantum Gravity, vol. 21, no. 5, p. S1031, 2004.

[31] K. Zandi, J. A. B'elanger, and Y.-A. Peter, "Design and demonstration of an in-plane silicon-on-insulator optical mems fabry-pérot-based accelerometer integrated with channel waveguides," Journal of Microelectromechanical systems, vol. 21, no. 6, pp. 1464-1470, 2012.

[32] M. Quan, J. Tian, and Y. Yao, "Ultra-high sensitivity fabry-pérot interferometer gas refractive index fiber sensor based on photonic crystal fiber and vernier effect," Optics letters, vol. 40, no. 21, pp. 4891-4894, 2015.

[33] E. Udd and W. B. Spillman Jr, Fiber optic sensors: an introduction for engineers and scientists. John Wiley & Sons, 2011.

[34] G. Keiser, Optical Fiber Communications, 2e. McGraw-Hill Science, Engineering & Mathematics, 1991.

[35] Wikipedia contributors, "Optical fiber—Wikipedia, the free encyclopedia," 2020. [Online; accessed 26 Jan. 2020].

[36] P. J. Winzer, D. T. Neilson, and A. R. Chraplyvy, "Fiber-optic transmission and networking: the previous 20 and the next 20 years," Optics express, vol. 26, no. 18, pp. 24190-24239, 2018.

[37] D. Soma, Y. Wakayama, S. Beppu, S. Sumita, T. Tsuritani, T. Hayashi, T. Nagashima, M. Suzuki, M. Yoshida, K. Kasai, et al., "10.16-peta-b/s dense sdm/wdm transmission over 6-mode 19-core fiber across the c+l band," Journal of Lightwave Technology, vol. 36, no. 6, pp. 1362-1368, 2018.

[38] K.-S. Lee, R. H. Kim, D.-Y. Yang, and S. H. Park, "Advances in 3d nano/microfabrication using two-photon initiated polymerization," Progress in Polymer Science, vol. 33, no. 6, pp. 631-681, 2008.

[39] J. Serbin, A. Egbert, A. Ostendorf, B. Chichkov, R. Houbertz, G. Domann, J. Schulz, C. Cronauer, L. Fröhlich, and M. Popall, "Femtosecond laser-induced two-photon polymerization of inorganic-organic hybrid materials for applications in photonics," Optics letters, vol. 28, no. 5, pp. 301-303, 2003.

[40] A. Ostendorf and B. N. Chichkov, "Two-photon polymerization: a new approach to micromachining," Photonics spectra, vol. 40, no. 10, p. 72, 2006.

[41] M. Kadic, G. W. Milton, M. van Hecke, and M. Wegener, "3d metamaterials," Nature Reviews Physics, vol. 1, no. 3, pp. 198-210, 2019.

[42] S. Thiele, K. Arzenbacher, T. Gissibl, H. Giessen, and A. M. Herkommer, "3d-printed eagle eye: Compound microlens system for foveated imaging," Science advances, vol. 3, no. 2, p. e1602655, 2017.

[43] S. Maruo, K. Ikuta, and H. Korogi, "Force-controllable, optically driven micromachines fabricated by single-step two-photon microstereolithography," Journal of Microelectromechanical Systems, vol. 12, no. 5, pp. 533-539, 2003.

[44] H. Xia, J. Wang, Y. Tian, Q.-D. Chen, X.-B. Du, Y.-L. Zhang, Y. He, and H.-B. Sun, "Ferrofluids for fabrication of remotely controllable micro-nanomachines by two-photon polymerization," Advanced Materials, vol. 22, no. 29, pp. 3204-3207, 2010.

[45] M. Kowalczyk, J. Haberko, and P. Wasylczyk, "Microstructured gradient-index antireflective coating fabricated on a fiber tip with direct laser writing," Optics express, vol. 22, no. 10, pp. 12545-12550, 2014.

[46] H. West, Y. Garcia, L. Rechtman, M. Blau, and D. M. Marom, "Subwavelength nanopyramids 3d printed directly on optical fiber tip serving as anti-reflection coating," in 2018 International Conference on Optical MEMS and Nanophotonics (OMN), pp. 1-5, IEEE, 2018.

[47] T. Gissibl, S. Thiele, A. Herkommer, and H. Giessen, "Two-photon direct laser writing of ultracompact multi-lens objectives," Nature Photonics, vol. 10, no. 8, p. 554, 2016.

[48] S. Bianchi, V. Rajamanickam, L. Ferrara, E. Di Fabrizio, C. Liberale, and R. Di Leonardo, "Focusing and imaging with increased numerical apertures through multimode fibers with micro-fabricated optics," Optics letters, vol. 38, no. 23, pp. 4935-4938, 2013.

[49] T. Gissibl, S. Thiele, A. Herkommer, and H. Giessen, "Sub-micrometre accurate freeform optics by three-dimensional printing on single-mode fibres," Nature Communications, vol. 7, no. 1, pp. 1-9, 2016.

[50] S. Zhang, S.-J. Tang, S. Feng, Y.-F. Xiao, W. Cui, X. Wang, W. Sun, J. Ye, P. Han, Zhang, et al., "High-q polymer microcavities integrated on a multicore fiber facet for vapor sensing," Advanced Optical Materials, vol. 7, no. 20, p. 1900602, 2019.

[51] K. Markiewicz and P. Wasylczyk, "Photonic-chip-on-tip: compound photonic devices fabricated on optical fibers," Optics express, vol. 27, no. 6, pp. 8440-8445, 2019.

[52] H. E. Williams, D. J. Freppon, S. M. Kuebler, R. C. Rumpf, and M. A. Melino, "Fabrication of three-dimensional micro-photonic structures on the tip of optical fibers using su-8," Optics express, vol. 19, no. 23, pp. 22910-22922, 2011.

[53] A. Bertoncini and C. Liberale, "Polarization micro-optics: circular polarization from a fresnel rhomb 3d printed on an optical fiber," IEEE Photonics Technology Letters, vol. 30, no. 21, pp. 1882-1885, 2018.

[54] Y. Qi, S. Zhang, S. Feng, X. Wang, W. Sun, J. Ye, P. Han, and Y. Zhang, "Integrated mach-zehnder interferometer on the end facet of multicore fiber for refractive index sensing application," in 2017 International Conference on Optical Instruments and Technology: IRMMW-THz Technologies and Applications, vol. 10623, p. 106230T, International Society for Optics and Photonics, 2018.

[55] P. Gaso, D. Jandura, and J. Durisova, "Optical fiber tip with integrated mach-zehnder interferometer for sensor applications," Advances in Electrical and Electronic Engineering, vol. 17, no. 4, pp. 466-471, 2019.

[56] C. Liberale, E. Di Fabrizio, G. Cojoc, G. Perozziello, P. Candeloro, F. Bragheri, L. Ferrara, P. Minzioni, and I. Cristiani, "Optical fiber tweezers fabricated by two photon lithography," in The European Conference on Lasers and Electro-Optics, p. CLEB5 6, Optical Society of America, 2011.

[57] I. Martincek, M. Goraus, and D. Kacik, "Polymer photonic structures for lab-on-a-fiber applications," in 21st Czech-Polish-Slovak Optical Conference on Wave and Quantum Aspects of Contemporary Optics, vol. 10976, p. 109760W, International Society for Optics and Photonics, 2018.

[58] M. Power, A. J. Thompson, S. Anastasova, and G.-Z. Yang, "A monolithic force-sensitive 3d microgripper fabricated on the tip of an optical fiber using 2-photon polymerization," Small, vol. 14, no. 16, p. 1703964, 2018.

[59] H. Wang, Z. Xie, M. Zhang, H. Cui, J. He, S. Feng, X. Wang, W. Sun, J. Ye, P. Han, et al., "A miniaturized optical fiber microphone with concentric nanorings grating and microsprings structured diaphragm," Optics & Laser Technology, vol. 78, pp. 110-115, 2016.

[60] M. Li, Y. Liu, R. Gao, Y. Li, X. Zhao, and S. Qu, "Ultracompact fiber sensor tip based on liquid polymer-filled fabry-pérot cavity with high temperature sensitivity," Sensors and Actuators B: Chemical, vol. 233, pp. 496-501, 2016.

[61] R. K. Poduval, J. Coote, C. A. Mosse, M. C. Finlay, I. Papakonstantinou, and A. E. Desjardins, "3d printed micro-scale fiber optic probe for intravascular pressure sensing," in Biosensing and Nanomedicine XI, vol. 10728, p. 107280B, International Society for Optics and Photonics, 2018.

[62] M. Goraus, I. Martincek, and D. Pudis, "3d polymer based fabry-pérot interferometer for lab-on-fiber applications," in 2018 12th International Conference on Advanced Semiconductor Devices and Microsystems (ASDAM), pp. 1-4, IEEE, 2018.

[63] V. Melissinaki, M. Farsari, and S. Pissadakis, "A fiber-endface, fabry-pérot vapor microsensor fabricated by multiphoton polymerization," IEEE Journal of Selected Topics in Quantum Electronics, vol. 21, no. 4, pp. 344-353, 2014.

[64] B. Sutapun, M. Tabib-Azar, and A. Kazemi, "Pd-coated elastooptic fiber optic bragg grating sensors for multiplexed hydrogen sensing," Sensors and Actuators B: Chemical, vol. 60, no. 1, pp. 27-34, 1999.

[65] Wikipedia contributors, "Fiber bragg grating—Wikipedia, the free encyclopedia," 2019. [Online; accessed 26 Jan. 2020].

[66] H. Patrick, G. Williams, A. Kersey, J. Pedrazzani, and A. Vengsarkar, "Hybrid fiber bragg grating/long period fiber grating sensor for strain/temperature discrimination," IEEE Photonics Technology Letters, vol. 8, no. 9, pp. 1223-1225, 1996.

[67] J. Jung, H. Nam, B. Lee, J. O. Byun, and N. S. Kim, "Fiber bragg grating temperature sensor with controllable sensitivity," Applied optics, vol. 38, no. 13, pp. 2752-2754, 1999.

[68] J. Feng, M. Ding, J.-L. Kou, F. Xu, and Y.-Q. Lu, "An optical fiber tip micrograting thermometer," IEEE Photonics Journal, vol. 3, no. 5, pp. 810-814, 2011.

[69] A. N. Chryssis, S. M. Lee, S. B. Lee, S. S. Saini, and M. Dagenais, "High sensitivity evanescent field fiber bragg grating sensor," IEEE Photonics Technology Letters, vol. 17, no. 6, pp. 1253-1255, 2005.

[70] Y. Zhao, P. Wang, R. Lv, and X. Liu, "Highly sensitive airflow sensor based on fabry-pérot interferometer and vernier effect," Journal of Lightwave Technology, vol. 34, no. 23, pp. 5351-5356, 2016.

[71] O. Kilic, M. Digonnet, G. Kino, and O. Solgaard, "External fibre fabry-pérot acous-tic sensor based on a photonic-crystal mirror," Measurement Science and Technology, vol. 18, no. 10, p. 3049, 2007.

[72] J. A. Garcia, D. Monz'on-Herna'ndez, O. Cuevas, B. Noriega-Luna, and E. Bustos, "Optical fiber detector for monitoring volatile hydrocarbons during electrokinetic treatment of polluted soil," Journal of Chemical Technology & Biotechnology, vol. 91, no. 8, pp. 2162-2169, 2016.

[73] M. Quan, J. Tian, and Y. Yao, "Ultra-high sensitivity fabry-pérot interferometer gas refractive index fiber sensor based on photonic crystal fiber and vernier effect," Optics letters, vol. 40, no. 21, pp. 4891-4894, 2015.

[74] C. Liao, T. Hu, and D. Wang, "Optical fiber fabry-pérot interferometer cavity fabricated by femtosecond laser micromachining and fusion splicing for refractive index sensing," Optics express, vol. 20, no. 20, pp. 22813-22818, 2012.

[75] J. Ma, J. Ju, L. Jin, W. Jin, and D. Wang, "Fiber-tip micro-cavity for temperature and transverse load sensing," Optics express, vol. 19, no. 13, pp. 12418-12426, 2011.

[76] T. Wei, Y. Han, Y. Li, H.-L. Tsai, and H. Xiao, "Temperature-insensitive miniaturized fiber inline fabry-pérot interferometer for highly sensitive refractive index measurement," Optics Express, vol. 16, no. 8, pp. 5764-5769, 2008.

[77] Z. L. Ran, Y. J. Rao, W. J. Liu, X. Liao, and K. S. Chiang, "Laser-micromachined fabry-pérot optical fiber tip sensor for high-resolution temperature-independent measurement of refractive index," Optics express, vol. 16, no. 3, pp. 2252-2263, 2008.

[78] O. Kilic, M. Digonnet, G. Kino, and O. Solgaard, "External fibre fabry-pérot acoustic sensor based on a photonic-crystal mirror," Measurement Science and Technology, vol. 18, no. 10, p. 3049, 2007.

[79] J.-l. Kou, J. Feng, L. Ye, F. Xu, and Y.-q. Lu, "Miniaturized fiber taper reflective interferometer for high temperature measurement," Optics express, vol. 18, no. 13, pp. 14245-14250, 2010.

[80] X. Li, S. Lin, J. Liang, H. Oigawa, and T. Ueda, "High-sensitivity fiber-optic fabry-pérot interferometer temperature sensor," Japanese Journal of Applied Physics, vol. 51, no. 6S, p. 06FL10, 2012.

[81] O. Kilic, M. Digonnet, G. Kino, and O. Solgaard, "External fibre fabry-pérot acoustic sensor based on a photonic-crystal mirror," Measurement Science and Technology, vol. 18, no. 10, p. 3049, 2007.

[82] A. Said, M. Dugan, S. De Man, and D. Iannuzzi, "Carving fiber-top cantilevers with femtosecond laser micromachining," Journal of Micromechanics and Microengineering, vol. 18, no. 3, p. 035005, 2008.

[83] O. Kilic, M. Digonnet, G. Kino, and O. Solgaard, "External fibre fabry-pérot acoustic sensor based on a photonic-crystal mirror," Measurement Science and Technology, vol. 18, no. 10, p. 3049, 2007.

[84] H. Bae, X. Zhang, H. Liu, and M. Yu, "Miniature surface-mountable fabry-pérot pressure sensor constructed with a 45 angled fiber," Optics letters, vol. 35, no. 10, pp. 1701-1703, 2010.

[85] Z. Xie, S. Feng, P. Wang, L. Zhang, X. Ren, L. Cui, T. Zhai, J. Chen, Y. Wang, X. Wang, et al., "Demonstration of a 3d radar-like sers sensor micro- and nanofabricated on an optical fiber," Advanced Optical Materials, vol. 3, no. 9, pp. 1232-1239, 2015.

[86] M. Yao, X. Ouyang, J. Wu, A. P. Zhang, H.-Y. Tam, and P. Wai, "Optical fiber-tip sensors based on in-situ μ-printed polymer suspended-microbeams," Sensors, vol. 18, no. 6, p. 1825, 2018.

[87] I. Suchy, Handbook of die design, vol. 1998. McGraw-Hill New York, 2006.

[88] E. D. Lemma, F. Rizzi, T. Dattoma, B. Spagnolo, L. Sileo, A. Qualtieri, M. De Vittorio, and F. Pisanello, "Mechanical properties tunability of three-dimensional polymeric structures in two-photon lithography," IEEE transactions on nanotechnology, vol. 16, no. 1, pp. 23-31, 2016.

[89] J. W. Smith, "3-d multifunctional sensors fabricated on fiber tips using a two-photon polymerization process," 2019.

[90] N. Ismail, C. C. Kores, D. Geskus, and M. Pollnau, "Fabry-pérot resonator: spectral line shapes, generic and related airy distributions, linewidths, finesses, and performance at low or frequency-dependent reflectivity," Optics express, vol. 24, no. 15, pp. 16366-16389, 2016.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for fabricating a passive optical sensor on a tip of an optical fiber, the method comprising:
   perpendicularly cleaving a tip of an optical fiber;
   mounting the tip of the optical fiber in a specimen holder of a photosensitive polymer three-dimensional micromachining machine; and
   forming a three-dimensional microscopic optical structure within the photosensitive polymer that comprises a two cavity Fabry-Perot Interferometer (FPI) having a hinged optical layer that is pivotally coupled to a suspended structure;
   removing an uncured portion of the photosensitive polymer using a solvent;
   depositing a reflective layer on a mirror surface of the hinged optical layer; and
   positioning the pivotally hinged optical layer to a closed position with the suspended structure, aligning the mirror surface with the cleaved tip of the optical fiber.

2. The method of claim 1, wherein forming the three-dimensional microscopic optical structure comprises performing a two-photon polymerization process of a photosensitive polymer using a three-dimensional micromachining device.

3. The method of claim 1, wherein perpendicularly cleaving the tip of the optical fiber comprises providing the optical fiber that supports single mode light propagation for a 1550 to 1650 nm wavelength range and having a polyimide sheathing which can withstand temperatures up to 300° C.

4. The method of claim 1, wherein mounting the tip of the optical fiber in the specimen holder comprises attaching a fiber chuck over a semiconductor wafer opening in a specimen tray.

* * * * *